United States Patent
Dhupelia et al.

(10) Patent No.: US 11,537,311 B1
(45) Date of Patent: Dec. 27, 2022

(54) METHODS, APPARATUSES AND COMPUTER PROGRAM PRODUCTS FOR DYNAMIC DATA OBJECT REPLICATION AND DYNAMIC DATA OBJECT CONVERSION IN A NETWORK SERVICE CLOUD

(71) Applicants: ATLASSIAN PTY LTD, Sydney (AU); ATLASSIAN INC, San Francisco, CA (US)

(72) Inventors: Rohan Dhupelia, Sydney (AU); Stephen Lee, Sydney (AU); Carlos Khatchikian, Sydney (AU); Jon Hartlaub, Mountain View, CA (US); Arie Friedman, Sydney (AU); Benjamin Jackson, Sydney (AU)

(73) Assignees: ATLASSIAN PTY LTD, Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/305,095

(22) Filed: Jun. 30, 2021

(51) Int. Cl.
*G06F 3/06* (2006.01)
*G06F 9/4401* (2018.01)

(52) U.S. Cl.
CPC .............. *G06F 3/065* (2013.01); *G06F 3/067* (2013.01); *G06F 3/0619* (2013.01); *G06F 3/0661* (2013.01); *G06F 9/4401* (2013.01)

(58) Field of Classification Search
None
See application file for complete search history.

(56) References Cited

U.S. PATENT DOCUMENTS

| | | | |
|---|---|---|---|
| 10,592,352 B1 * | 3/2020 | Tanaka | G06F 11/1451 |
| 2019/0073227 A1 * | 3/2019 | Zhong | G06F 9/4492 |
| 2019/0075115 A1 * | 3/2019 | Anderson | H04L 63/102 |
| 2020/0265058 A1 * | 8/2020 | Maquaire | G06F 16/2365 |

* cited by examiner

*Primary Examiner* — Kaushikkumar M Patel
(74) *Attorney, Agent, or Firm* — Alston & Bird LLP

(57) ABSTRACT

Various examples herein described are directed to methods, apparatuses and computer program products configured for dynamically replicating and/or converting source data objects in one or more external-access-limited source data object repositories to replica data objects in one or more external-service-accessible replica data object repositories in a network service cloud. For example, a network service server of the network service cloud may generate a plurality of bootstrap task objects and at least one change data capture (CDC) task object, and may generate the replica data objects based on the task objects.

20 Claims, 16 Drawing Sheets

METHODS, APPARATUSES AND COMPUTER PROGRAM PRODUCTS FOR DYNAMIC DATA OBJECT REPLICATION AND DYNAMIC DATA OBJECT CONVERSION IN A NETWORK SERVICE CLOUD

BACKGROUND

Applicant has identified many technical deficiencies and problems associated with data processing in complex computer networks.

BRIEF SUMMARY

In general, embodiments of the present disclosure provide methods, apparatus, systems, computing devices, and/or the like for dynamically replicating data objects and/or dynamically converting data objects in a network service cloud.

In accordance with various embodiments of the present disclosure, an apparatus is provided. The apparatus comprises at least one processor and at least one non-transitory memory comprising program code. In some embodiments, the at least one non-transitory memory and the program code configured to, with the at least one processor, cause the apparatus to at least: receive a data object replication request associated with a tenant identifier, wherein the tenant identifier is associated with an external-access-limited source data object repository comprising a plurality of source data objects associated with a plurality of source data object type identifiers; in response to the data object replication request, generate a plurality of bootstrap task objects and at least one change data capture (CDC) task object, wherein each of the plurality of source data object type identifiers is associated with one of the plurality of bootstrap task objects; execute the plurality of bootstrap task objects to generate a plurality of replication data objects corresponding to the plurality of source data objects and store the plurality of replication data objects to a processing queue data object; in response to receiving at least one CDC event indication associated with at least one of the plurality of source data objects, execute the at least one CDC task object to generate at least one CDC data object based on the at least one CDC event indication and store the at least one CDC data object to the processing queue data object; generate a plurality of replica data objects corresponding to the plurality of source data objects based at least in part on processing the plurality of replication data objects and the at least one CDC data object stored to the processing queue data object; and store the plurality of replica data objects in an external-service-accessible replica data object repository.

In some embodiments, the plurality of bootstrap task objects represent a plurality of electronic tasks for replicating the plurality of source data objects.

In some embodiments, when executing the plurality of bootstrap task objects, the at least one non-transitory memory and the program code are configured to, with the at least one processor, cause the apparatus to at least: replicate the plurality of source data objects.

In some embodiments, the at least one CDC task object represents an electronic task for monitoring the at least one CDC event indication associated with the at least one of the plurality of source data objects.

In some embodiments, the plurality of source data object type identifiers comprises at least a project data object type identifier and an issue data object type identifier.

In some embodiments, each source data object of the plurality of source data objects is associated with a source data object sequence identifier.

In some embodiments, each of the plurality of replication data objects is associated with a replication data object serial identifier and a replication data object sequence identifier, wherein the replication data object serial identifier corresponds to a source data object serial identifier of one of the plurality of source data objects, wherein the replication data object sequence identifier corresponds to a source data object sequence identifier of one of the plurality of source data objects.

In some embodiments, the at least one CDC data object is associated with at least one CDC data object serial identifier and at least one CDC data object sequence identifier based at least in part on the at least one CDC event indication.

In some embodiments, when generating the plurality of replica data objects, the at least one non-transitory memory and the program code are configured to, with the at least one processor, cause the apparatus to: retrieve a corresponding replication data object from the processing queue data object; and determine whether a corresponding replication data object serial identifier of the corresponding replication data object matches a corresponding CDC data object serial identifier of a corresponding CDC data object.

In some embodiments, the at least one non-transitory memory and the program code are configured to, with the at least one processor, cause the apparatus to: in response to determining that the corresponding replication data object serial identifier does not match the corresponding CDC data object serial identifier, store the corresponding replication data object as one of the plurality of replica data objects in the external-service-accessible replica data object repository.

In some embodiments, the at least one non-transitory memory and the program code are configured to, with the at least one processor, cause the apparatus to: in response to determining that the corresponding replication data object serial identifier matches the corresponding CDC data object serial identifier, determine whether a corresponding replication data object sequence identifier of the corresponding replication data object satisfies a corresponding CDC data object sequence identifier of the corresponding CDC data object.

In some embodiments, the at least one non-transitory memory and the program code are configured to, with the at least one processor, cause the apparatus to: in response to determining that the corresponding replication data object sequence identifier satisfies the corresponding CDC data object sequence identifier, store the corresponding replication data object as a replica data object of the plurality of replica data objects in the external-service-accessible replica data object repository; and in response to determining that the corresponding replication data object sequence identifier does not satisfy the corresponding CDC data object sequence identifier, store the corresponding CDC data object as the replica data object of the plurality of replica data objects in the external-service-accessible replica data object repository.

In some embodiments, the at least one non-transitory memory and the program code are configured to, with the at least one processor, cause the apparatus to: determine a corresponding replica data object type identifier of a corresponding replica data object stored in the external-service-accessible replica data object repository; select, based at least in part on the corresponding replica data object type identifier, a corresponding data object conversion schema;

and convert the corresponding replica data object based at least in part on the corresponding data object conversion schema.

In some embodiments, the corresponding replica data object is associated with an issue data object type identifier, wherein, when converting the corresponding replica data object, the at least one non-transitory memory and the program code are configured to, with the at least one processor, cause the apparatus to: extract issue priority metadata, issue resolution metadata, issue status metadata, issue status category metadata, issue type metadata, and issue history metadata from the corresponding replica data object; and generate a star-structured issue data object based on the corresponding replica data object, wherein the star-structured issue data object comprises a plurality of nodes, wherein each of the plurality of nodes is based at least in part on one or more of the issue priority metadata, the issue resolution metadata, the issue status metadata, the issue status category metadata, the issue type metadata, and the issue history metadata.

In some embodiments, the corresponding replica data object is associated with a project data object type identifier, wherein, when converting the corresponding replica data object, the at least one non-transitory memory and the program code are configured to, with the at least one processor, cause the apparatus to: extract project type metadata, project changelog metadata, project version metadata, project category metadata, and project component metadata from the corresponding replica data object; and generate a star-structured project data object based on the corresponding replica data object, wherein the star-structured project data object comprises a plurality of nodes, wherein each of the plurality of nodes is based at least in part on the project type metadata, the project changelog metadata, the project version metadata, the project category metadata, and the project component metadata.

In some embodiments, the at least one non-transitory memory and the program code are configured to, with the at least one processor, cause the apparatus to: generate a tenant data object associated with the tenant identifier based at least in part on the plurality of replica data objects.

In some embodiments, the at least one non-transitory memory and the program code are configured to, with the at least one processor, cause the apparatus to: receive a data object access request associated with the tenant data object and a requestor identifier; determine whether the requestor identifier is associated with the tenant identifier; in response to determining that the requestor identifier is associated with the tenant identifier, retrieve the tenant data object from the external-service-accessible replica data object repository; and in response to determining that the requestor identifier is not associated with the tenant identifier, generate a data object access denial message.

In accordance with various embodiments of the present disclosure, a computer-implemented method is provided. The computer-implemented method comprises receiving a data object replication request associated with a tenant identifier, wherein the tenant identifier is associated with an external-access-limited source data object repository comprising a plurality of source data objects associated with a plurality of source data object type identifiers; in response to the data object replication request, generating a plurality of bootstrap task objects and at least one change data capture (CDC) task object, wherein each of the plurality of source data object type identifiers is associated with one of the plurality of bootstrap task objects; executing the plurality of bootstrap task objects to generate a plurality of replication data objects corresponding to the plurality of source data objects and store the plurality of replication data objects to a processing queue data object; in response to receiving at least one CDC event indication associated with at least one of the plurality of source data objects, executing the at least one CDC task object to generate at least one CDC data object based on the at least one CDC event indication and store the at least one CDC data object to the processing queue data object; generating a plurality of replica data objects corresponding to the plurality of source data objects based at least in part on processing the plurality of replication data objects and the at least one CDC data object stored to the processing queue data object; and storing the plurality of replica data objects in an external-service-accessible replica data object repository.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprises an executable portion configured to: receive a data object replication request associated with a tenant identifier, wherein the tenant identifier is associated with an external-access-limited source data object repository comprising a plurality of source data objects associated with a plurality of source data object type identifiers; in response to the data object replication request, generate a plurality of bootstrap task objects and at least one change data capture (CDC) task object, wherein each of the plurality of source data object type identifiers is associated with one of the plurality of bootstrap task objects; execute the plurality of bootstrap task objects to generate a plurality of replication data objects corresponding to the plurality of source data objects and store the plurality of replication data objects to a processing queue data object; in response to receiving at least one CDC event indication associated with at least one of the plurality of source data objects, execute the at least one CDC task object to generate at least one CDC data object based on the at least one CDC event indication and store the at least one CDC data object to the processing queue data object; generate a plurality of replica data objects corresponding to the plurality of source data objects based at least in part on processing the plurality of replication data objects and the at least one CDC data object stored to the processing queue data object; and store the plurality of replica data objects in an external-service-accessible replica data object repository.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1A:
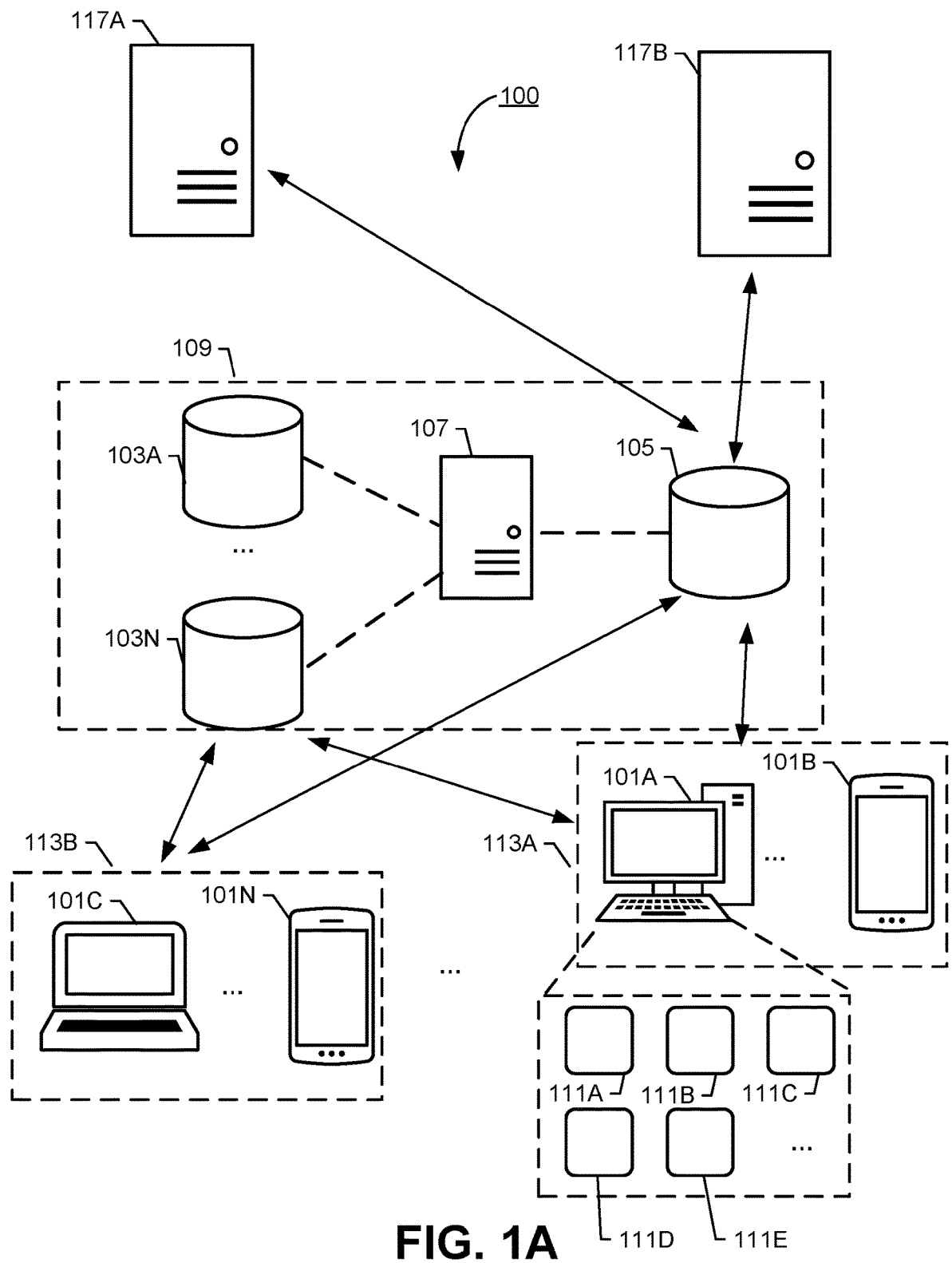
Figure 1B:
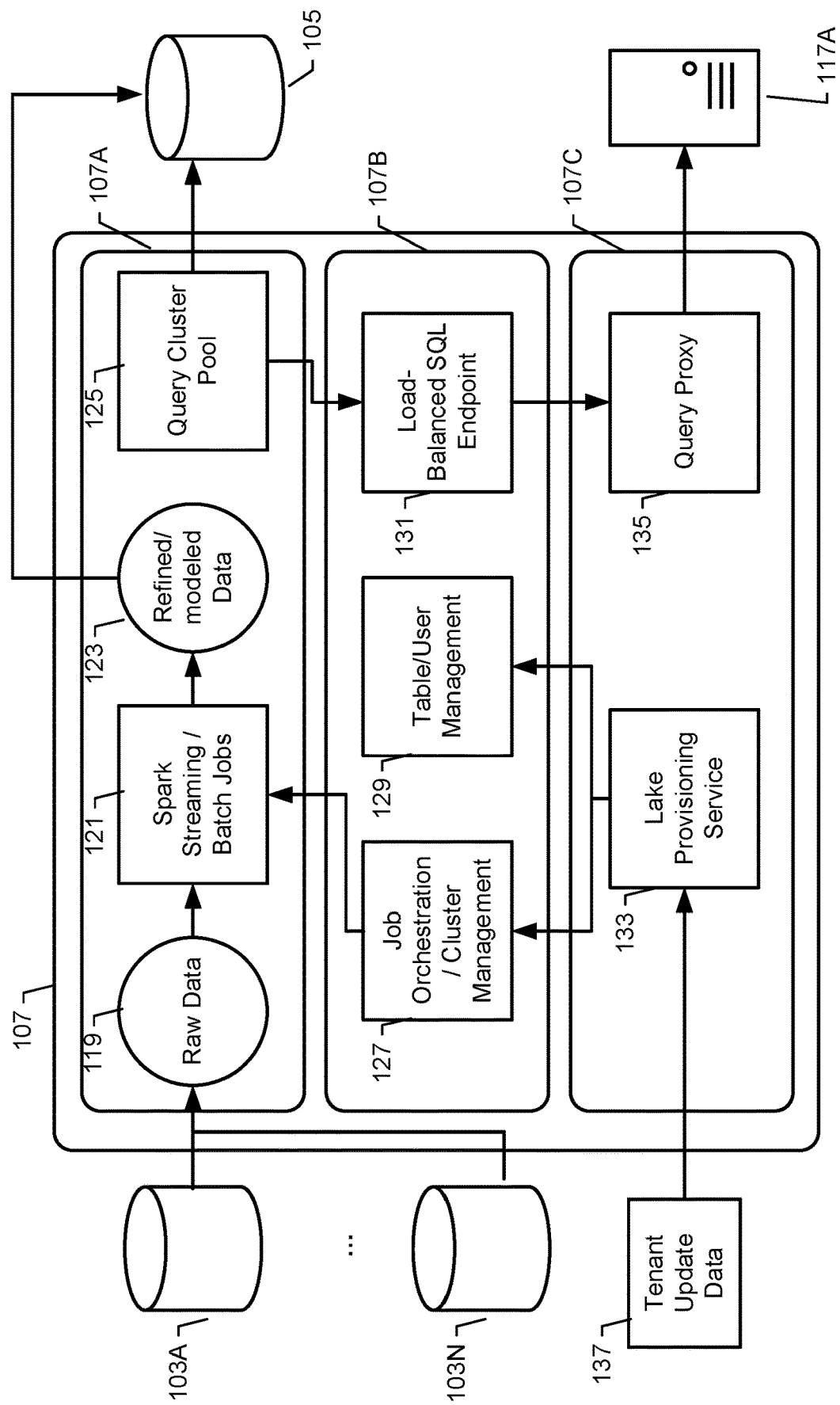
Figure 2:
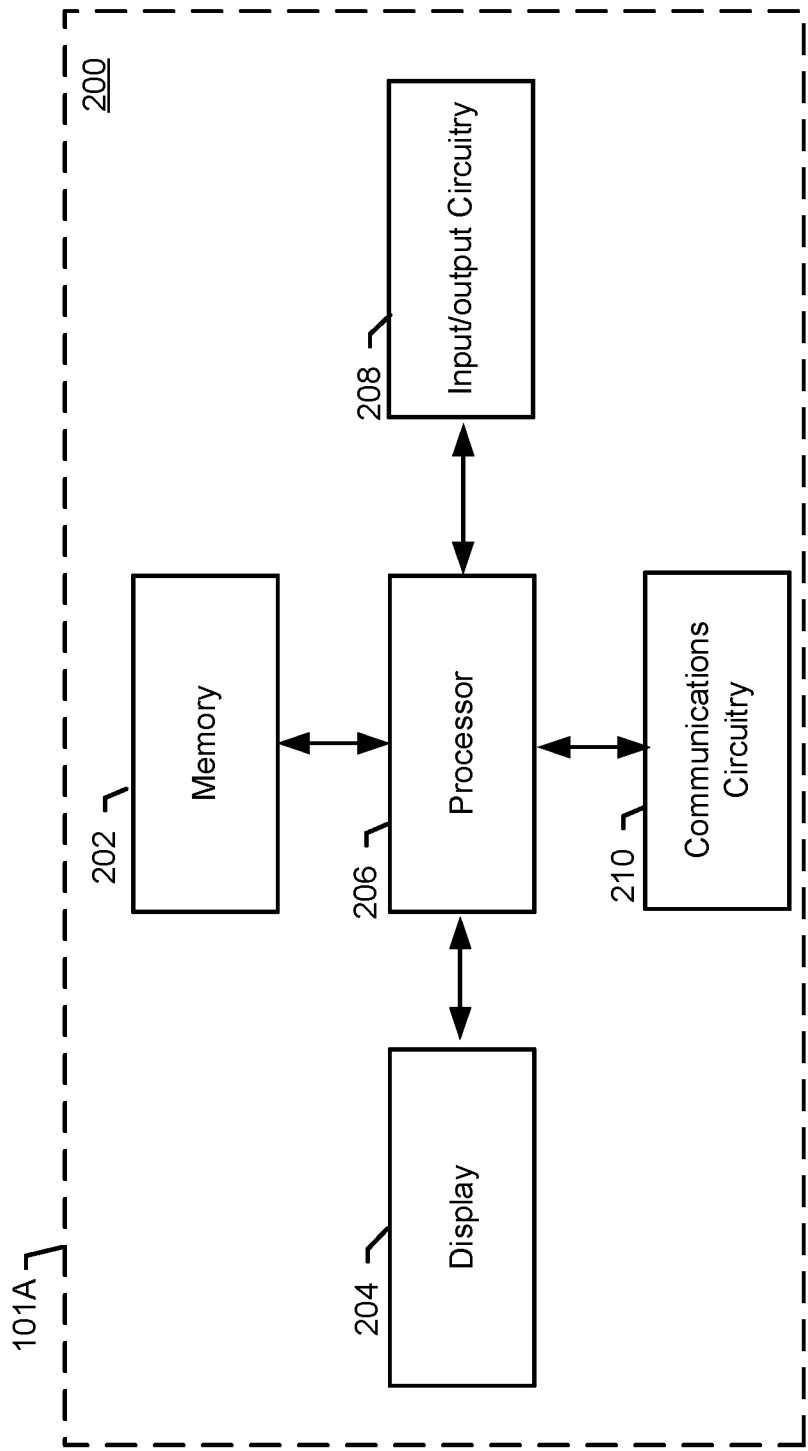
Figure 3:
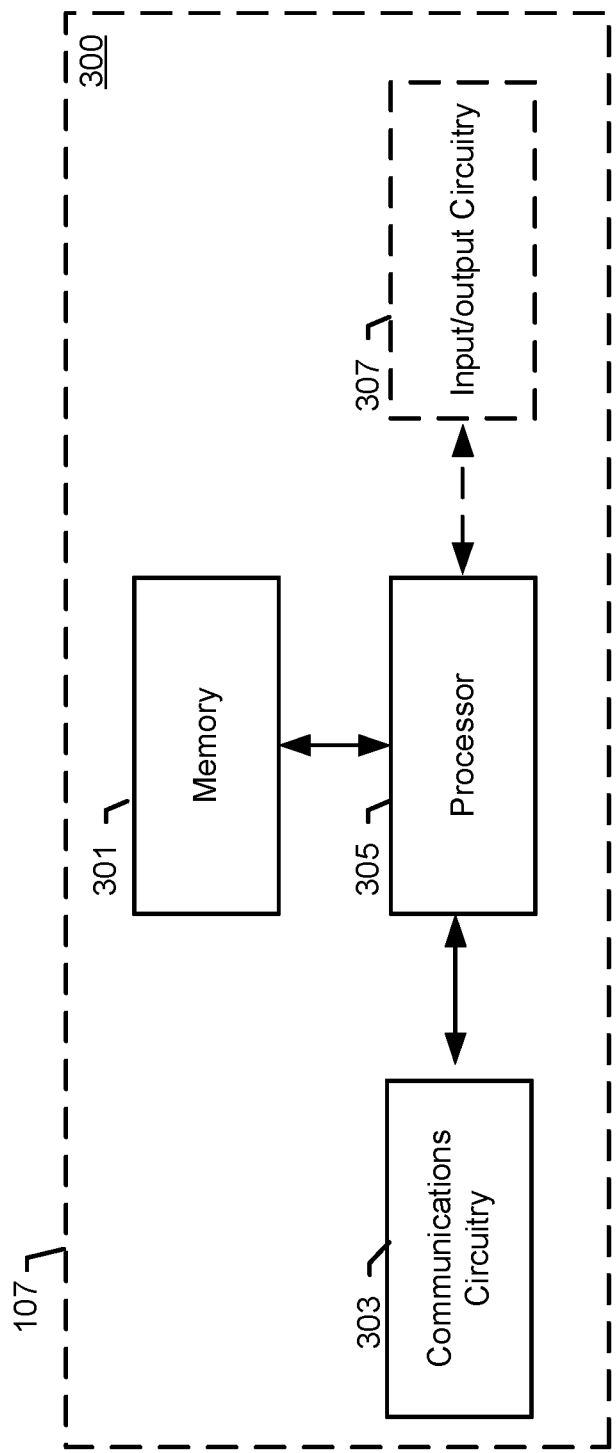
Figure 4:
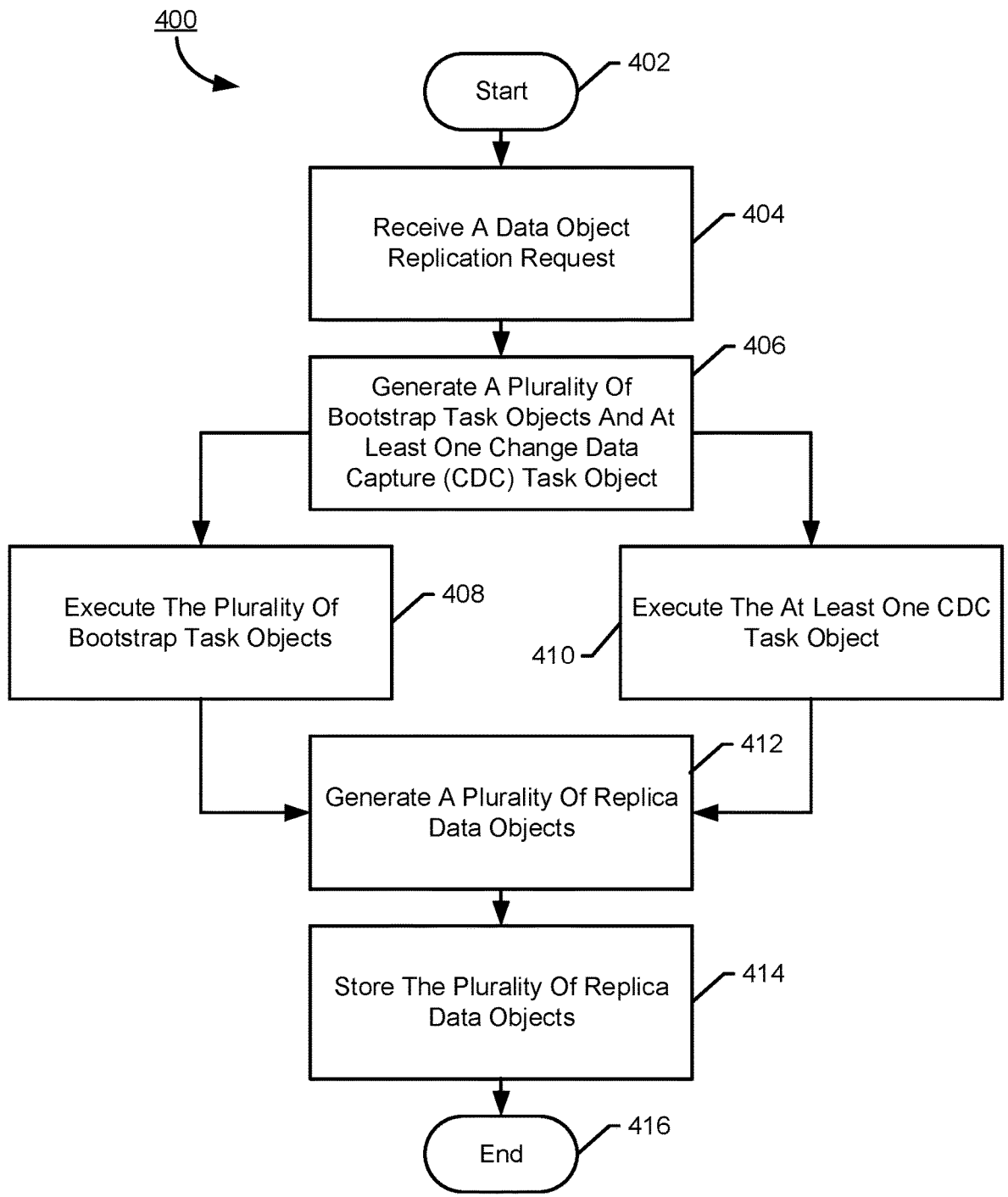
Figure 5:
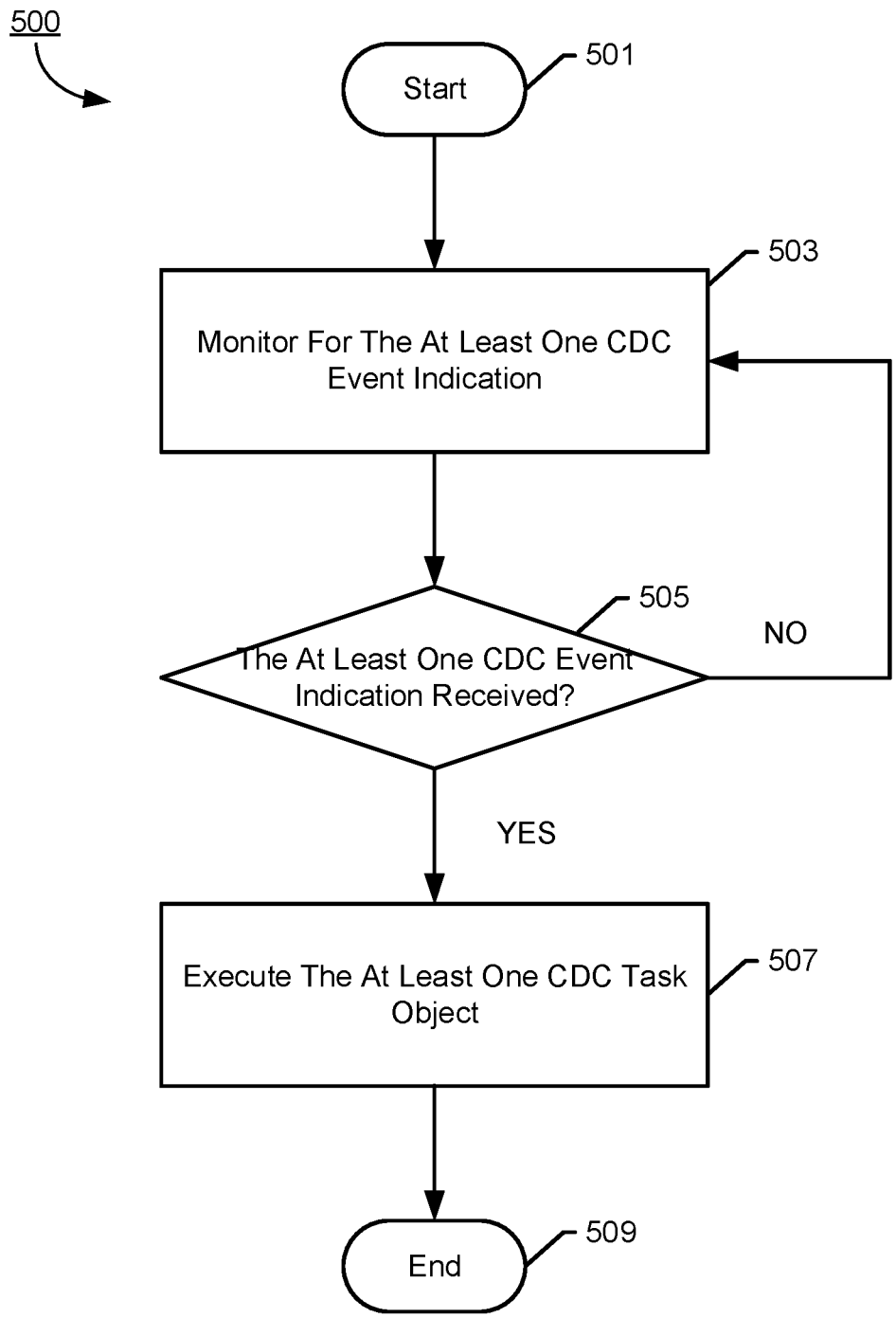
Figure 6:
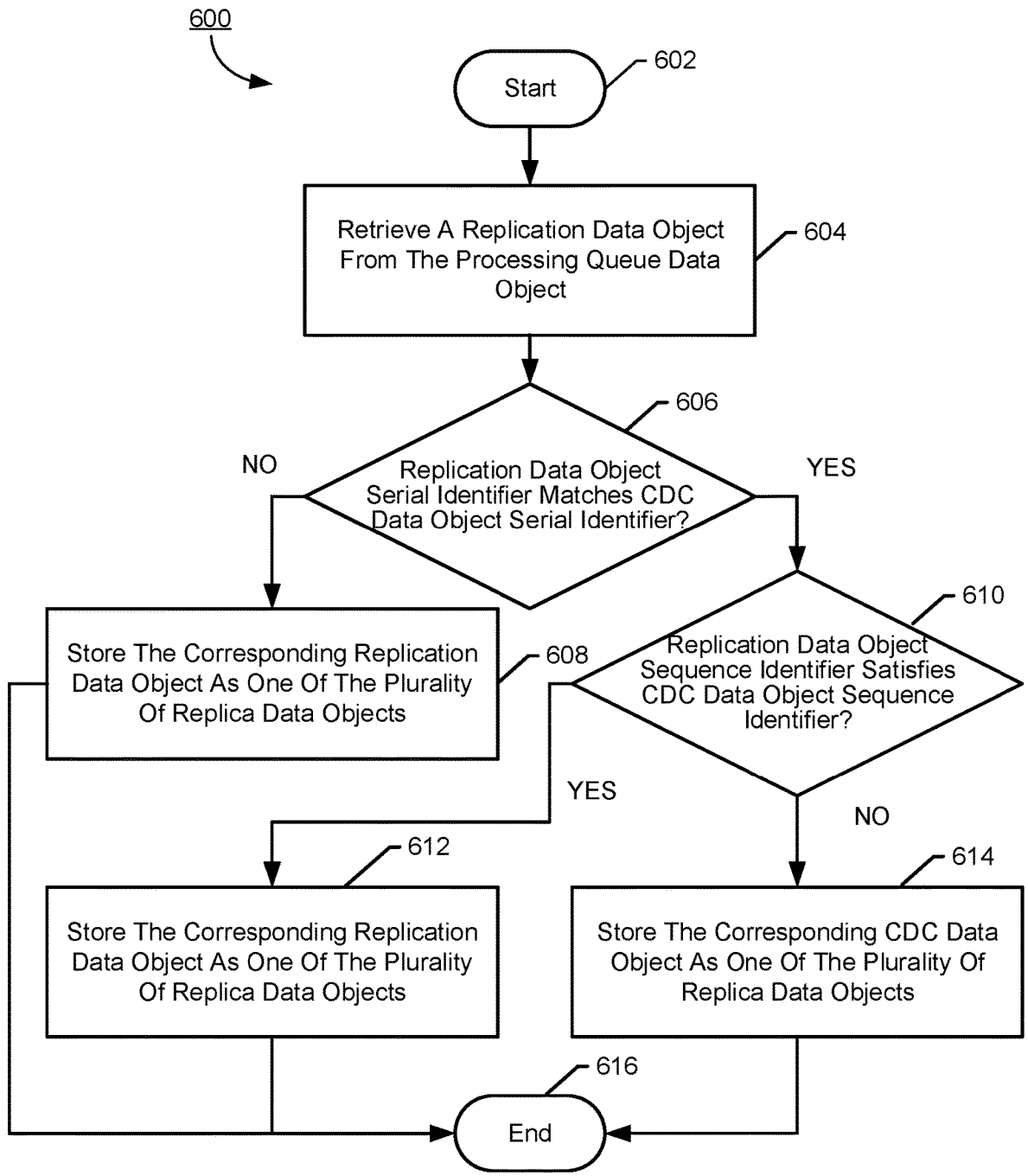
Figure 7:
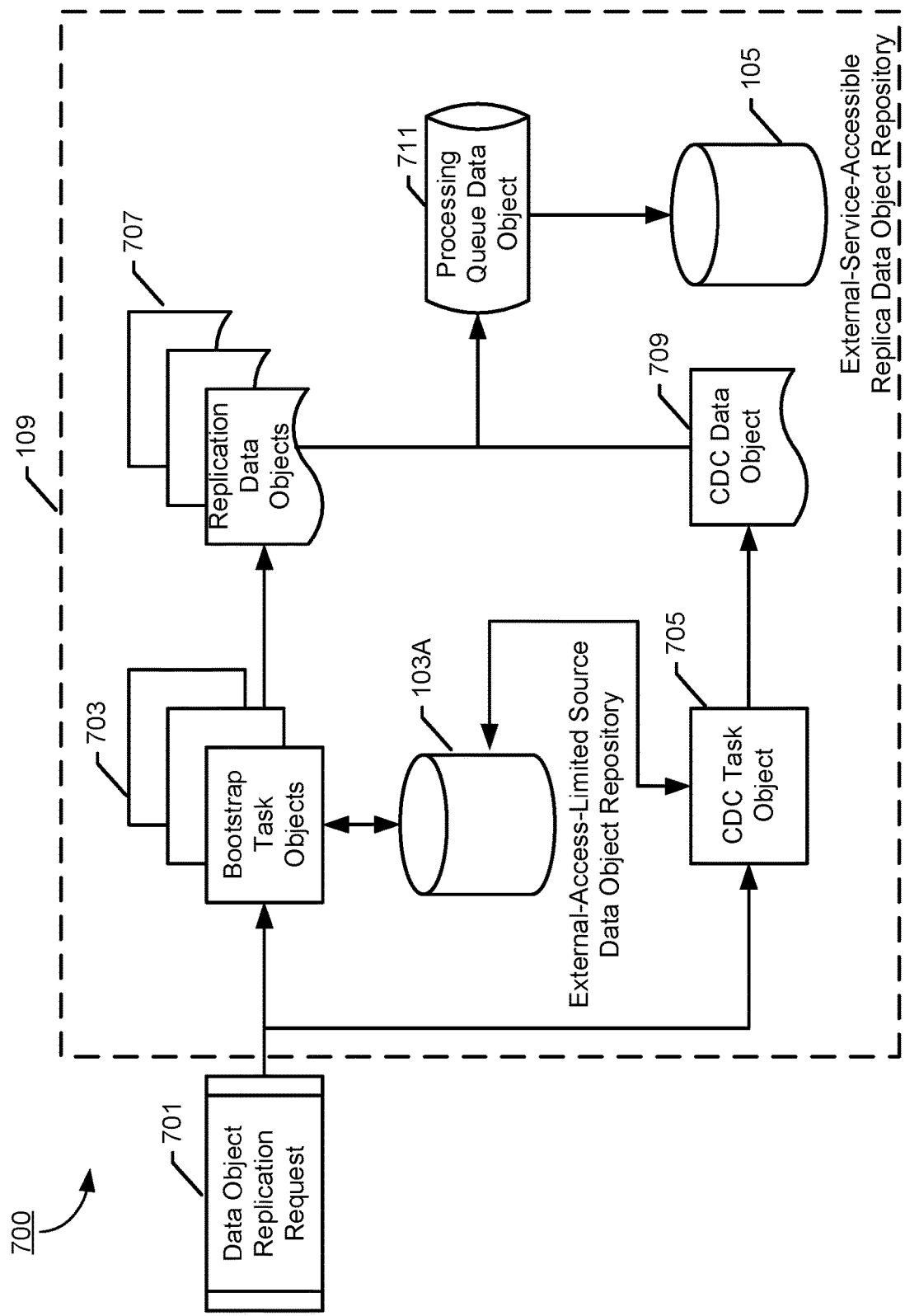
Figure 8:
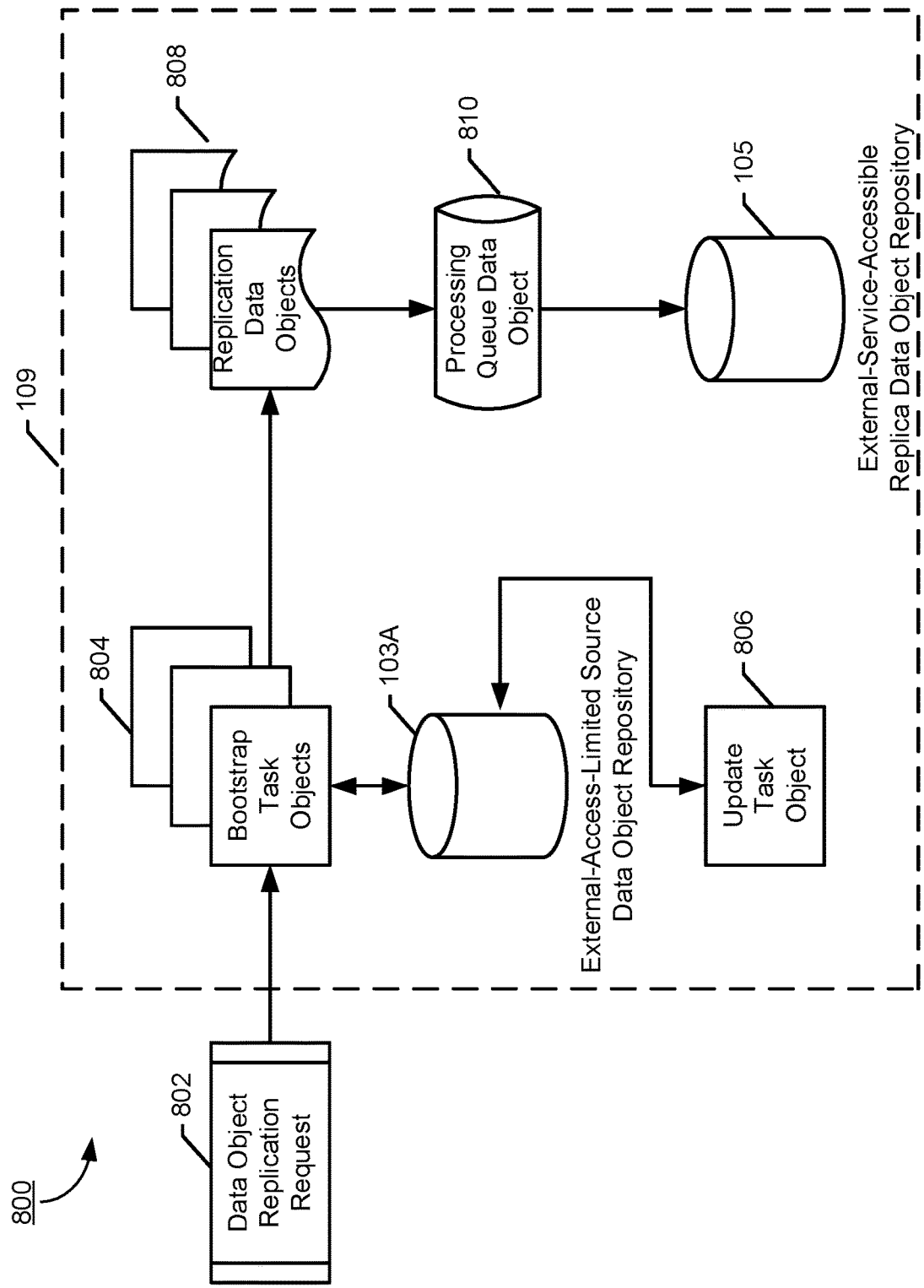
Figure 9:
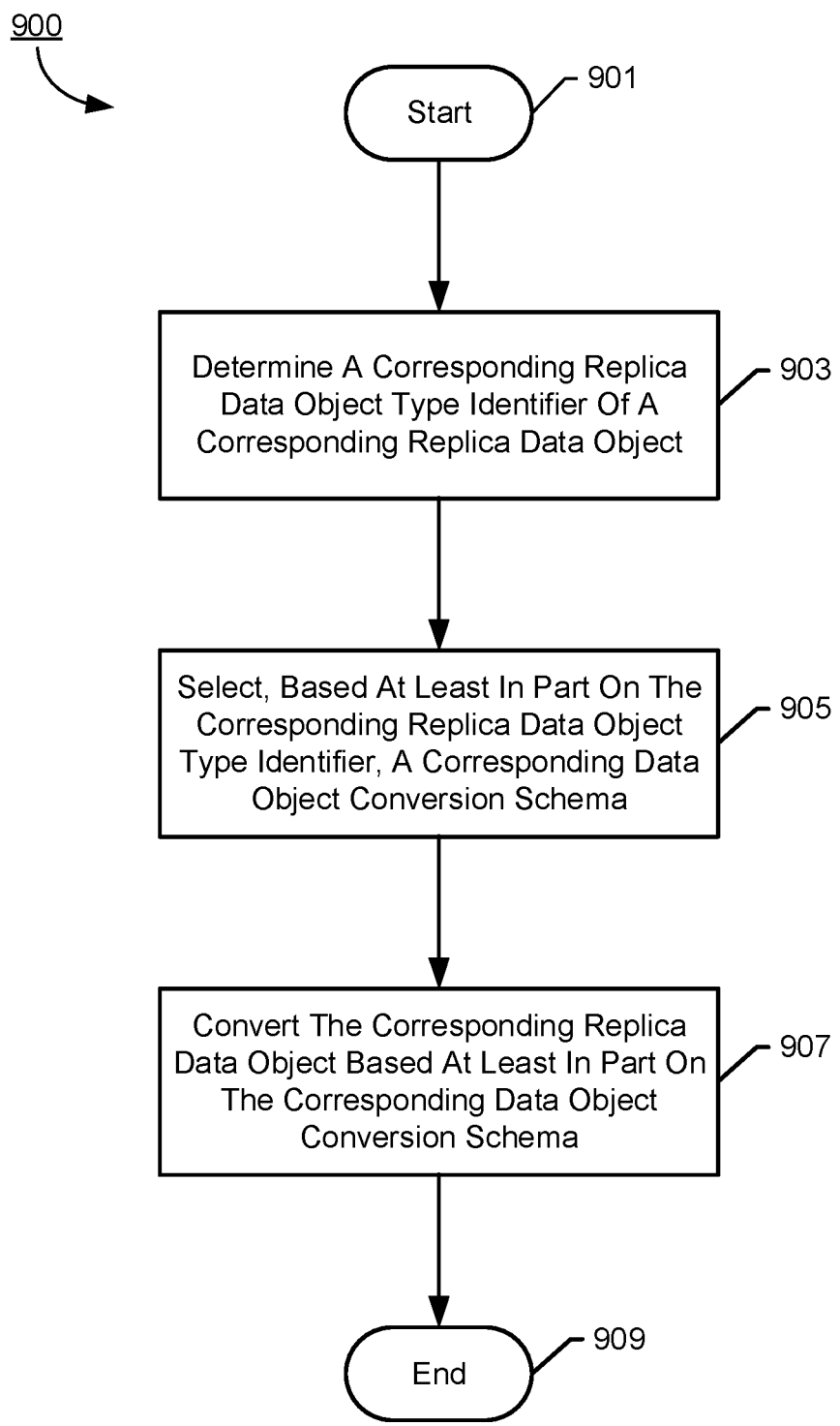
Figure 10:
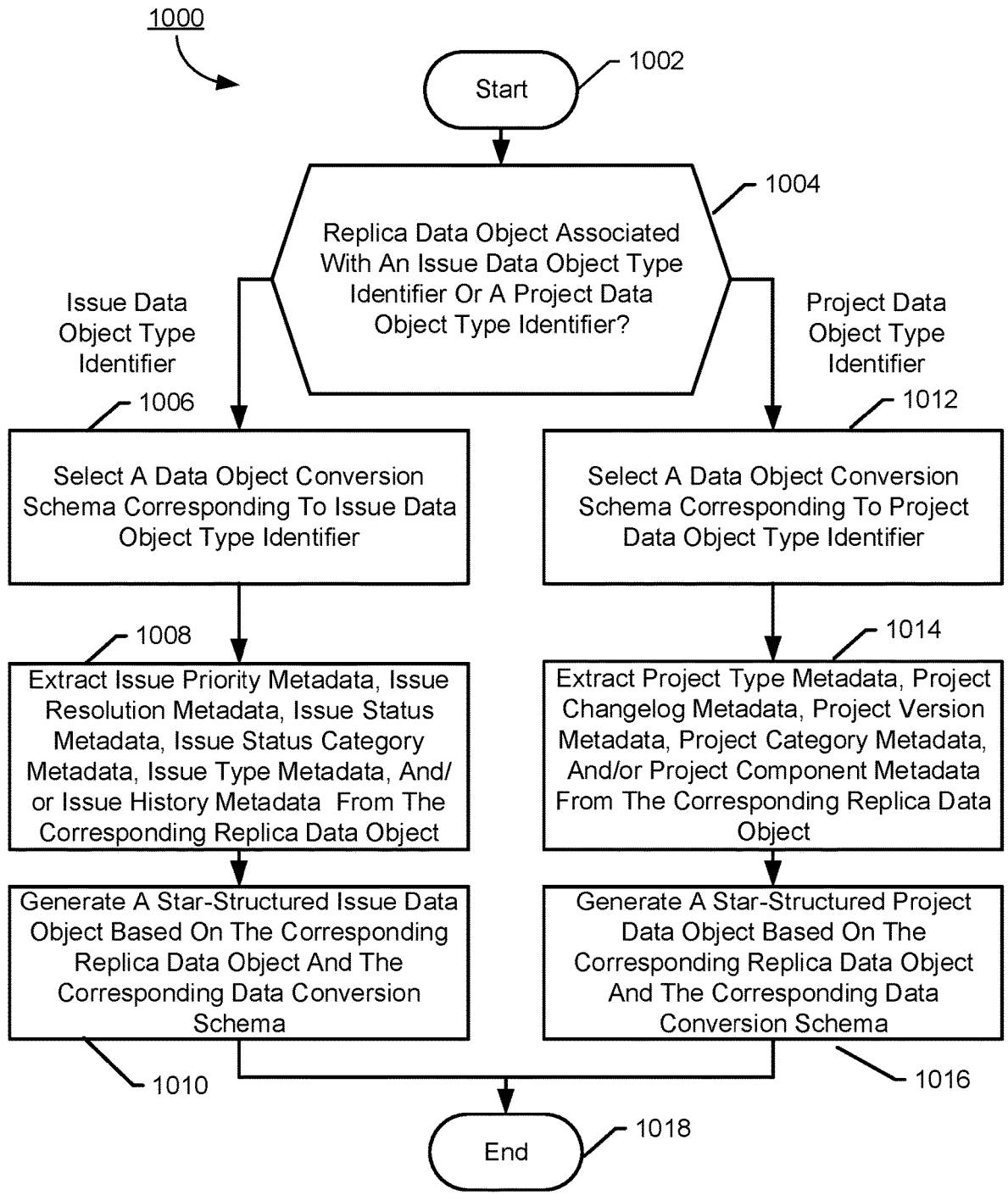
Figure 11:
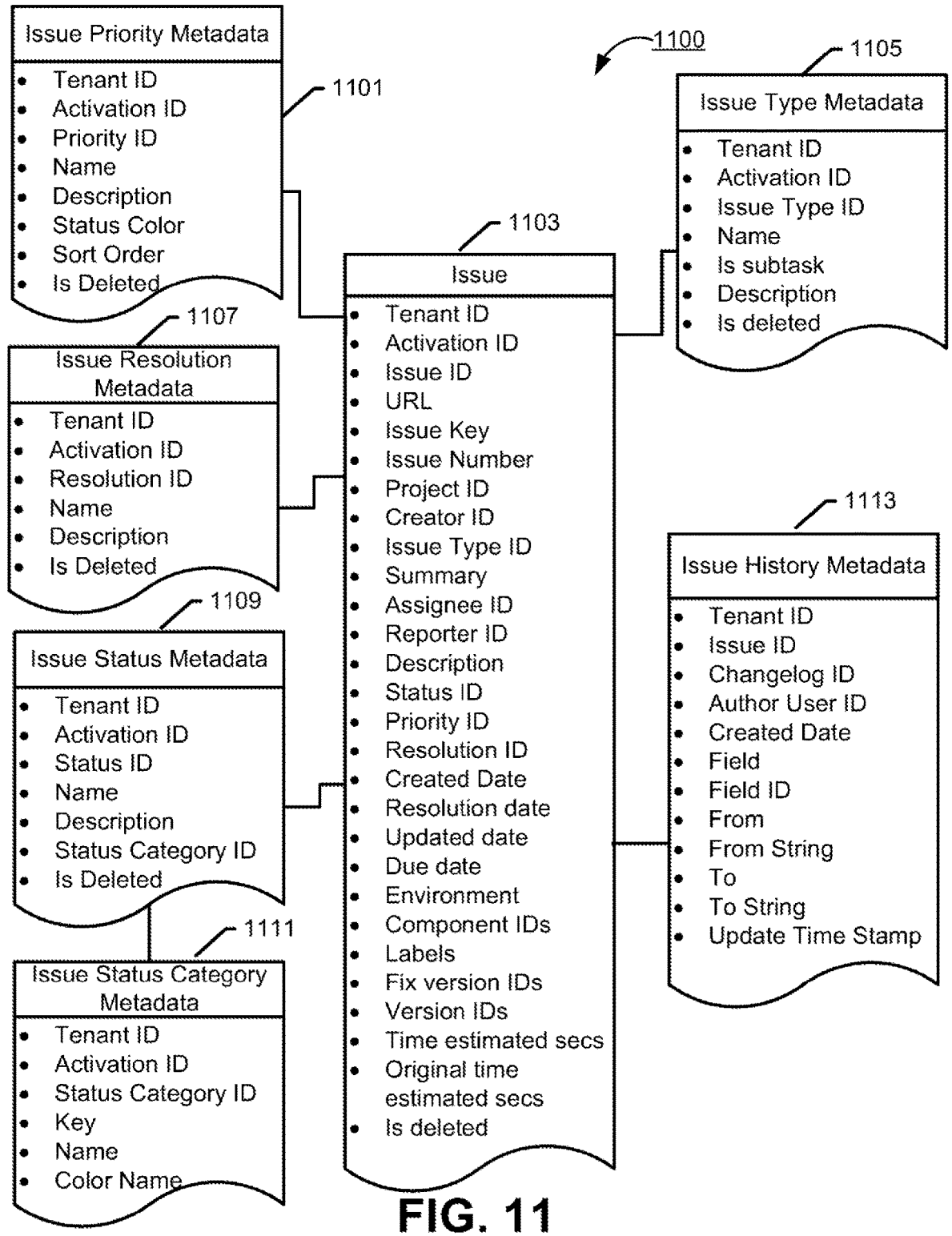
Figure 12:
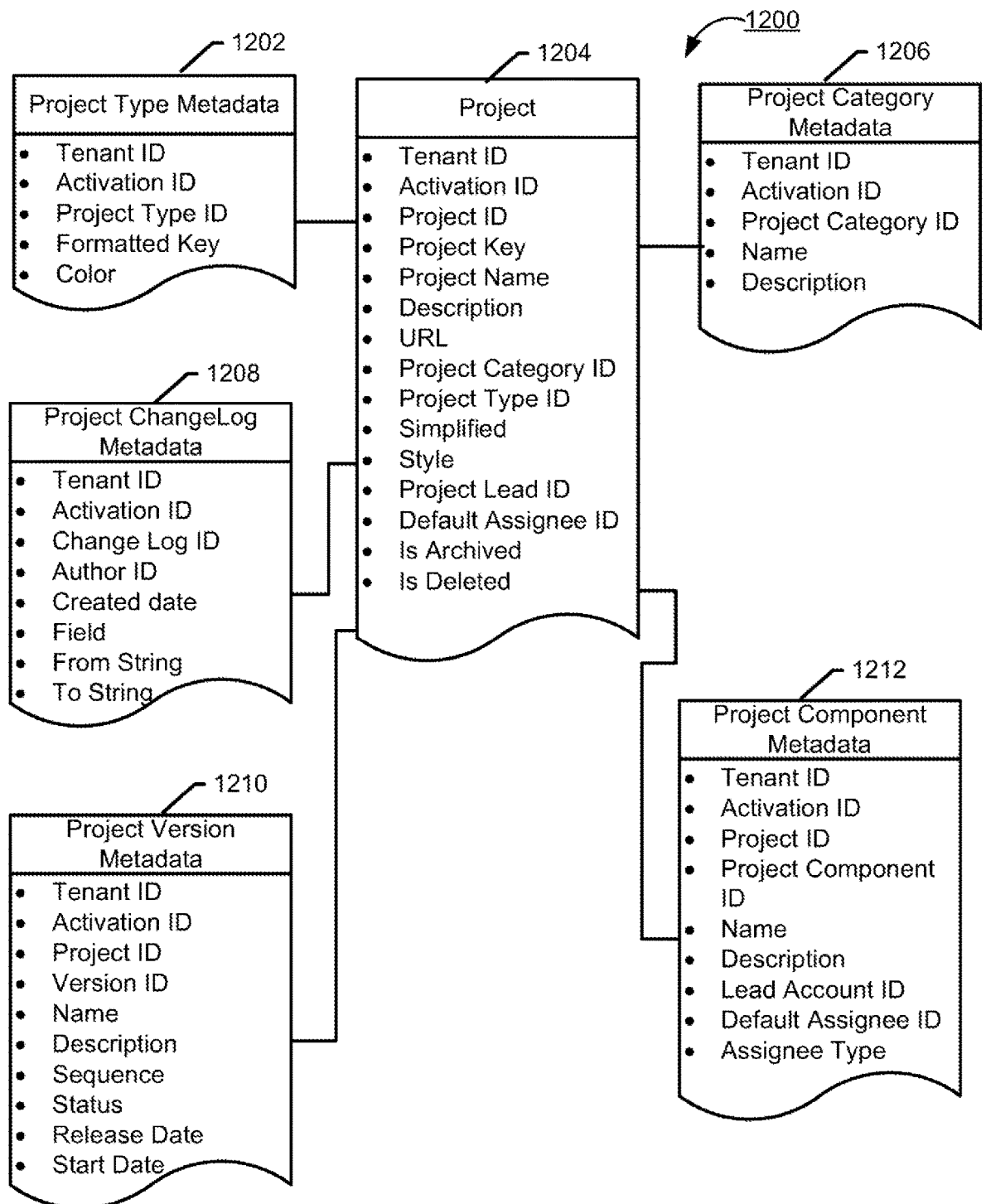
Figure 13:
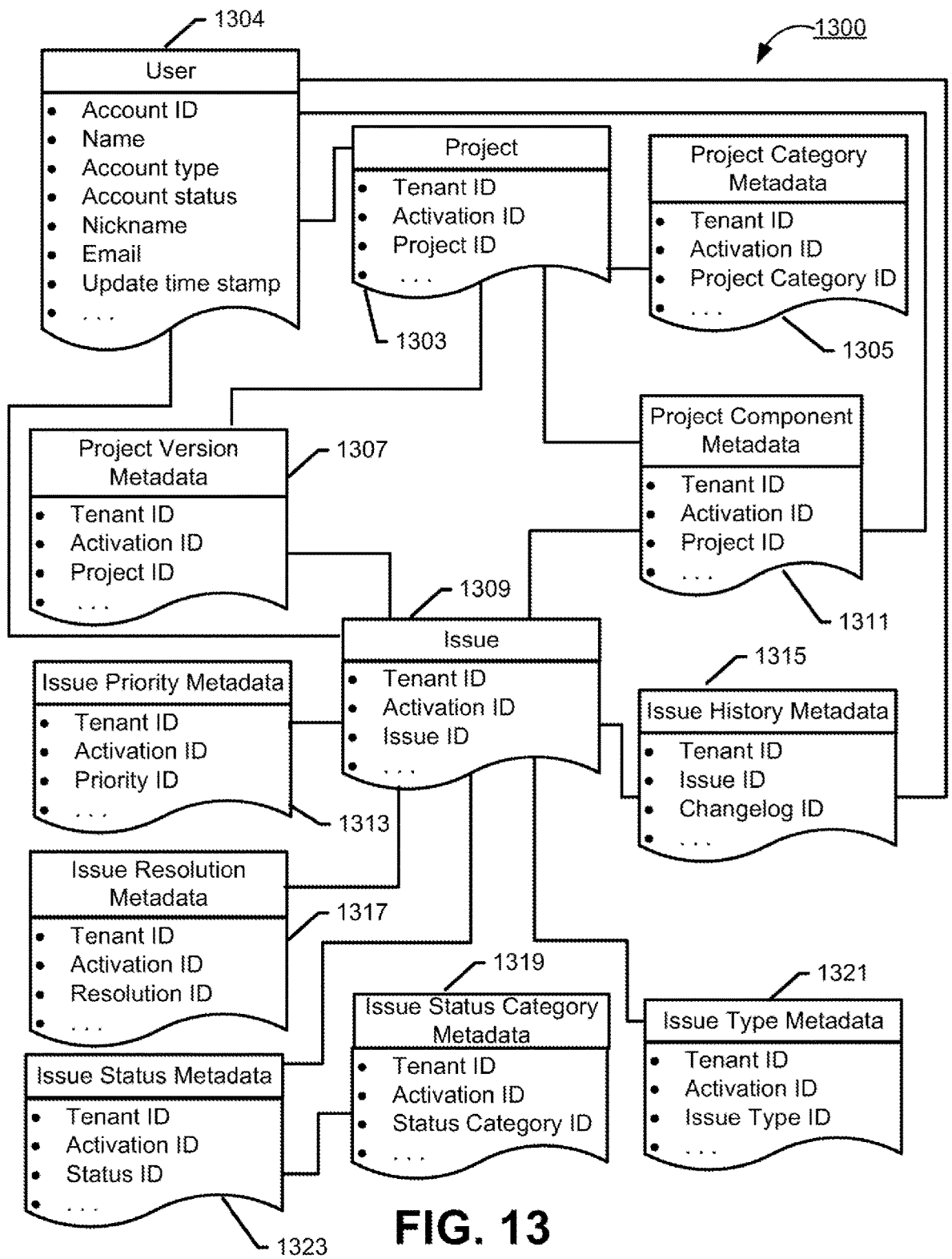
Figure 14:
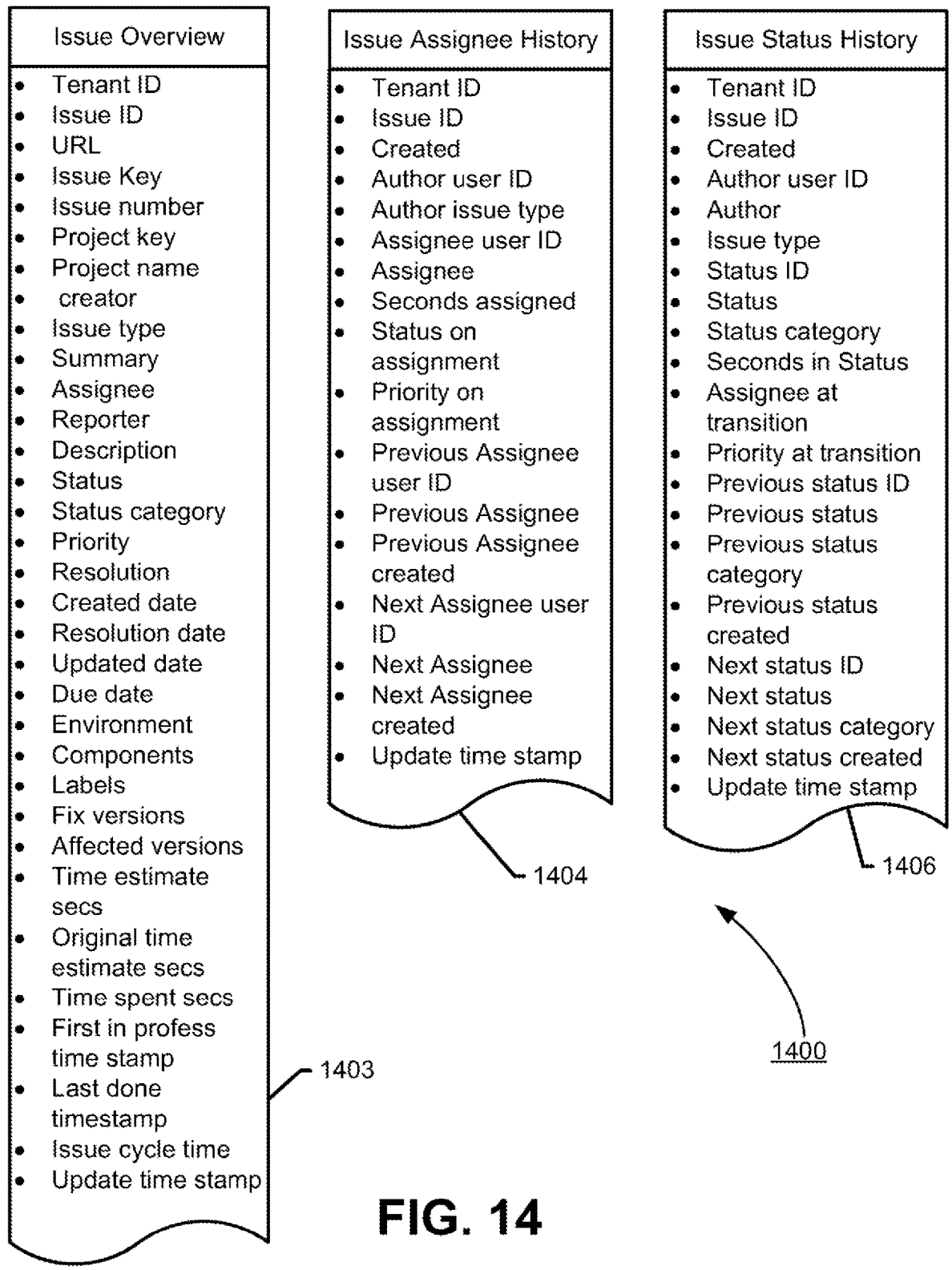
Figure 15:
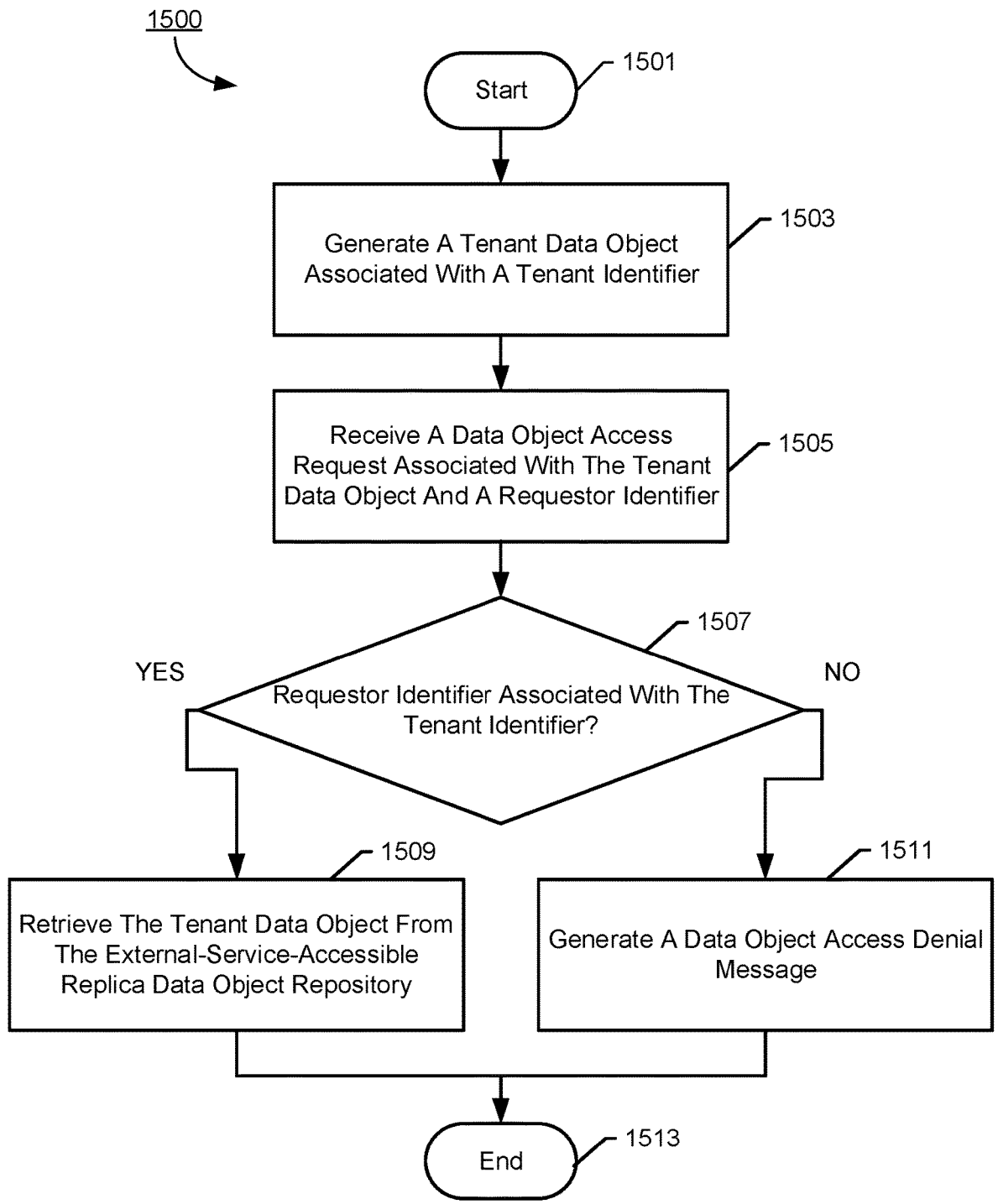

Having thus described some embodiments in general terms, references will now be made to the accompanying drawings, which are not necessarily drawn to scale, and wherein:

FIG. 1A and FIG. 1B are example system architecture diagrams illustrating an example network service cloud in communication with other devices (such as client devices) in accordance with some embodiments of the present disclosure;

FIG. 2 is an example infrastructure diagram illustrating an example computing device (for example, an example client device) in accordance with some embodiments of the present disclosure;

FIG. 3 is an example infrastructure diagram illustrating an example computing device (for example, an example network service server) in accordance with some embodiments of the present disclosure;

FIG. 4 is an example flowchart illustrating an example method for generating and storing a plurality of replica data objects in accordance with some embodiments of the present disclosure;

FIG. 5 is an example flowchart illustrating an example method for determining whether to execute at least one CDC task object in accordance with some embodiments of the present disclosure;

FIG. 6 is an example flowchart illustrating an example method associated with generating and storing a plurality of replica data objects based at least in part on processing data objects in the processing queue data object in accordance with some embodiments of the present disclosure;

FIG. 7 is an example diagram illustrating an example method for generating and storing a plurality of replica data objects in accordance with some embodiments of the present disclosure;

FIG. 8 is an example diagram illustrating an example method for generating and storing a plurality of replica data objects in accordance with some embodiments of the present disclosure;

FIG. 9 is an example flowchart illustrating an example method associated with converting a plurality of replica data objects in accordance with some embodiments of the present disclosure;

FIG. 10 is an example flowchart illustrating an example method associated with converting a plurality of replica data objects based at least in part on data object types associated with the replica data objects in accordance with some embodiments of the present disclosure;

FIG. 11 is an example star-structured issue data object in accordance with some embodiments of the present disclosure;

FIG. 12 is an example star-structured project data object in accordance with some embodiments of the present disclosure;

FIG. 13 is an example star-structured tenant data object in accordance with some embodiments of the present disclosure; and FIG. 14 is an example table-structured issue data object in accordance with some embodiments of the present disclosure; and FIG. 15 is an example flowchart illustrating an example method associated with handling a data object access request in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of" and "be comprised substantially of."

The phrases "in one embodiment," "according to one embodiment," "in some embodiments," "in some examples," "for example," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Overview

Various embodiments of the present disclosure relate generally to dynamically duplicating data objects and/or dynamically converting data objects in a computer network environment (including, but not limited to, in a network service cloud). For example, various embodiments of the present disclosure generate one or more replica data objects based on one or more source data objects stored in an external-access-limited source data object repository, and store the one or more replica data objects in an external-service-accessible replica data object repository.

In a cloud computing environment, system resources are interconnected with one another to handle one or more computing tasks such as, but not limited to, generating data, storing data, transmitting data, and/or the like. In some examples, one or more system resources in an example cloud computing environment may be in hardware forms such as, but not limited to, one or more central processing units (CPUs), one or more memory units (such as, but not limited to, random-access memories, hard disk drives), one or more servers, one or more relays, one or more routers, and/or the like. In some examples, one or more system resources in an example cloud computing environment may be in software forms, such as, but not limited to, one or more embedded software (such as, but not limited to, firmware), one or more web applications (such as, but not limited to, one or more application software that run on a server), and/or the like. In some embodiments, one or more system resources in an example cloud computing environment may be in the form of one or more computer networks. In some embodiments, one or more system resources in an example cloud computing environment may be in other forms.

Cloud computing environments provide various technical benefits, such as, but not limited to, on-demand availability of system resources that can be scaled based on the need and/or requirements for performing computing tasks. However, cloud computing environments are also faced with many technical challenges and difficulties.

For example, in an "on-premises" computing environment where system resources are located within servers owned, secured, and managed by an organization or a user, the organization or the user may be granted root access privileges to each database(s) in the on-premises computing environment. For example, a user with root access privileges may retrieve all data and/or information stored in the databases(s) in on-premises computing environment, enabling generating visualization reports based on data and/or information stored the database(s) (e.g., often through business intelligence (BI) tools), conducting automatic examinations on data and/or information stored in the database(s) to identify or "flag" issues and/or errors associated with data and/or information, implementing machine learning models and/or artificial intelligence algorithms to generate one or more predictions based on the data and/or information, and/or the like.

In contrast with "on-premises" computing environments, many cloud computing environments do not provide customer users with root access privileges of database(s) that support the cloud computing environments, and/or provide limited, restricted, and/or insufficient access that cannot handle a large amount of data queries. This lack of root access and/or sufficient access limits the ability of customer users to rapidly query and dynamically access organization data in the manner provided by "on-premises" computing environments. While some cloud computing environment may provide Application Programming Interfaces (APIs) that are configured to provide selected data access capabilities to customer users in a cloud computing environment, these APIs are restrictive in nature as the customer users do not have root access privileges to all data and/or information stored in the database(s). Such APIs are also limited in that they can be easily overrun or driven offline if they receive too much traffic or traffic that exceeds rate limit policies.

The above referenced limitations of cloud computing environments (including those that provide APIs) reduce or eliminate the technical capability to enable customer users to use modern BI tools to generate visualization reports based on data and/or information stored the database(s), conduct automatic examinations on data and/or information stored in the database(s) to identify or "flag" issues and/or errors associated with the data and/or information, implement machine learning models and/or artificial intelligence algorithms to generate one or more predictions based on the data and/or information, and/or the like. The lack of direct, root access to database(s) in a cloud computing environment not only carries the above limitations but also causes many technical challenges and difficulties in network data communications.

For example, in a cloud computing environment where an API is provided, a large number of users may request access via the API at the same time, creating a significant level of data and/or information to be exchanged through the API. APIs in cloud computing environments are often designed for conducting simple transactions in a low latency and low data rate manner. Accordingly, such APIs are not configured to handle the demand and requirements of supporting modern BI tools and implementation of machine learning and artificial intelligence customer use cases. As such, many cloud computing environment APIs are plagued by technical issues such as, but not limited to, latency issues, slow responses, throttling, and timeouts.

As another example, data and/or information in a cloud computing environment may be stored in a distributed manner, such that multiple databases may be implemented to store data and/or information associated with a single user. In some examples, each database may have its own data formatting guidelines and protocols, causing data and/or information from different databases having different structures and/or formats that may not be compatible with one another. Due to incompatibility, such data and/or information may not be ingested by a downstream data analysis service. The lack of the direct, root access to database(s) further causes external users to the cloud computing environment incapable of converting data and/or information to a consistent format or structure.

Example embodiments of the present disclosure may overcome the above-referenced technical challenges, limitations, and difficulties while providing various technical benefits.

For example, various embodiments of the present disclosure may provide an external-service-accessible replica data object repository in a network service cloud that allows root access of data and/or information stored in the external-service-accessible replica data object repository. To overcome technical restrictions causing many cloud computing environments lacking the capability to generate visualization reports, various embodiments of the present disclosure may generate one or more replica data objects based on the source data objects stored in an external-access-limited source data object repository. Various embodiments of the present disclosure may store the replica data objects in the external-service-accessible replica data object repository, thereby allowing users who are external to the network service cloud to generate visualization reports based on data and/or information stored the external-service-accessible replica data object repository, conduct automatic examinations on data and/or information stored in the external-service-accessible replica data object repository to identify or "flag" issues and/or errors associated with the data and/or information, implement machine learning models and/or artificial intelligence algorithms to generate one or more predictions based on the data and/or information, and/or the like, In some examples, various embodiments of the present disclosure may dynamically replicate data objects so that the replica data objects capture not only the original source data objects, but also any changes that have been made to the original source data objects. For example, various embodiments of the present disclosure may utilize bootstrap task objects for replicating source data objects, as well as change data event (CDC) task objects to capture changes associated with the source data objects. Various embodiments of the present disclosure execute bootstrap task objects and CDC tasks objects to generate replication data objects and CDC data objects, respectively. Various embodiments of the present disclosure store the replication data objects and CDC data objects in a processing queue data object, and may generate replica data objects based on the processing queue data object. As such, various embodiments of the present disclosure may provide fast access to the latest data and/or information stored in the network service cloud to users who are external to the network service cloud, and may reduce the possibilities of latency, slow responses, throttling, and timeouts.

In some embodiments, various embodiments of the present disclosure may provide data object conversion schemes that define converting data objects to a consistent format and/or structure. Various embodiments of the present disclosure may dynamically convert the data objects based at least in part on a data object type associated with the data object. The resultant data objects from the data object conversion may be suitable for ingestion by a downstream data analysis service (for example, a machine learning model).

As such, example embodiments of the present disclosure overcome technical challenges and difficulties faced by the network computing environment, and provide various technical advantages and benefits, details of which are described herein.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

The terms "set" or "subset" refer to a collection of zero or more elements.

In the present disclosure, the terms "network service cloud" or "network service system" refer to a software platform and associated hardware that are configured to support and maintain various data services and/or data exchanges among various devices. Examples of data services that are supported and/or maintained by a network service cloud include, but not limited to, data computing, data management, data monitoring, data storage, data migration, data development, data analytics, data deployment, and/or the like.

In some embodiments, a network service cloud may comprise one or more internal computing devices, such as, but not limited to, one or more network service servers, one or more data object repositories, and/or the like. For example, an example network service cloud may establish sufficient data communication protocols in association with the one or more network service servers and the one or more data object repositories, such that the one or more network service servers and the one or more data object repositories are considered "within" the network service cloud and can perform one or more data services without the need of direct management by a user. In the present disclosure, an example computing device that is internal to or within a network service cloud is also referred to as a "cloud computing device."

In some embodiments, one or more external computing devices may communicate and/or interact with an example network service cloud. Examples of external computing devices may include, but not limited to, client devices, computing devices that are within the premises of an organization and remote from the network service cloud, network servers that are remote from the network service cloud, third-party service computing devices that provide data services supplemental to the network service cloud, and/or the like. In the present disclosure, an example computing device that is external to or outside of a network service cloud may also be referred to as an "on-premise computing device."

In the present disclosure, the term "data object" refers to a data structure that represents one or more functionalities and/or characteristics associated with data and/or information. In some embodiments, a data object may be associated with one or more software (for example, one or more computer programs) and/or one or more hardware (for example, one or more servers and/or one or more client devices). For example, a data object may provide a functional unit for one or more computer programs. A user who operates a client device that is executing the one or more computer programs may provide user input associated with the data object, and the user input may comprise an electronic selection of a data object, an electronic request to modify, manipulate, change a data object, and/or the like. In some embodiments, data items in an example data object may include metadata. The term "metadata" refers to one or more parameters, one or more data fields, or the like that describe or are associated with one or more attributes of a data object.

In various embodiments of the present discourse, various data objects can be categorized based on various data object types and/or various data object structures. In some embodiments, examples of types associated with data objects may include, but not limited to, issue data object type, project data object type, tenant data object type, and/or the like, which may be defined based on data and/or information represented by the corresponding data object.

For example, a data object of an "issue data object type" (also described as an "issue data object" herein) refers to a type of data object that represents an organized set of data and/or information in a network service cloud that is associated with an individual piece of a task that must be completed. For example, an issue data object may be associated with an issue-based (or project-based) collaborative task management system that operates in a network service cloud. In this example, the issue data object may represent and/or comprise data and/or information such as, but not limited to, a to-do item, a software application bug that needs to be fixed, a virtual IT help-desk ticket, a leave request form, among many other possibilities.

In the present disclosure, the term "issue data object type identifier" refers to an identifier that indicates, identifies or flags a data object as an issue data object. In some embodiments, the issue data object type identifier may be in the form of text string(s), numerical character(s), alphabetical character(s), alphanumeric code(s), American Standard Code for Information Interchange (ASCII) character(s), and/or the like.

As described above, a data object may comprise one or more metadata. In the present disclosure, the term "metadata" refers to one or more parameters, one or more data fields, and/or the like, that describe or are associated with one or more attributes of a data object. For example, an issue data object may comprise issue priority metadata, issue resolution metadata, issue status metadata, issue status category metadata, issue type metadata, and issue history metadata, and/or the like.

In the present disclosure, the term "issue priority metadata" refers to a type of metadata associated with an issue data object that may describe or comprise data and/or information associated with a priority of the issue data object. In some embodiments, the issue priority metadata may be in the form of text string(s), numerical character(s), alphabetical character(s), alphanumeric code(s), ASCII character(s), and/or the like.

In the present disclosure, the term "issue resolution metadata" refers to a type of metadata associated with an issue data object that may describe or comprise data and/or information associated with a resolution of the issue represented by the issue data object. In some embodiments, the issue resolution metadata may be in the form of text string(s), numerical character(s), alphabetical character(s), alphanumeric code(s), ASCII character(s), and/or the like.

In the present disclosure, the term "issue status metadata" refers to a type of metadata associated with an issue data object that may describe or comprise data and/or information associated with a current status of the issue data object. In some embodiments, the issue status metadata may be in the form of text string(s), numerical character(s), alphabetical character(s), alphanumeric code(s), ASCII character(s), and/or the like.

In the present disclosure, the term "issue status category metadata" refers to a type of metadata associated with an issue data object that may describe or comprise data and/or information associated with a status category associated with the issue represented by the issue data object. In some embodiments, the issue status category metadata may be in the form of text string(s), numerical character(s), alphabetical character(s), alphanumeric code(s), ASCII character(s), and/or the like.

In the present disclosure, the term "issue type metadata" refers to a type of metadata associated with an issue data object that may describe or comprise data and/or information associated with a type of the issue data object. In some embodiments, the issue type metadata may be in the form of text string(s), numerical character(s), alphabetical character(s), alphanumeric code(s), ASCII character(s), and/or the like.

In the present disclosure, the term "issue history metadata" refers to a type of metadata associated with an issue data object that may describe or comprise data and/or information associated with a history of the issue data object. In some embodiments, the issue history metadata may be in the form of text string(s), numerical character(s), alphabetical character(s), alphanumeric code(s), ASCII character(s), and/or the like.

In some embodiments, a data object is of a "project data object type" (also described as a "project data object" herein) refers to a type of data object that represents an organized set of issue data objects. For example, a project data object may be associated with an issue-based (or project-based) collaborative task management system that operates in a network service cloud. In this example, the project data object may represent and/or comprise data and/or information such as, but not limited to, a project, a software application, a virtual IT help-desk, among many other possibilities.

In the present disclosure, the term "project data object type identifier" refers to an identifier that indicates, identifies, or flags a data object as a project data object. In some embodiments, the project data object type identifier may be in the form of text string(s), numerical character(s), alphabetical character(s), alphanumeric code(s), ASCII character(s), and/or the like.

In the present disclosure, the term "project category metadata" refers to a type of metadata associated with a project data object that may describe or comprise data and/or information associated with a category of the project data object. In some embodiments, the project category metadata may be in the form of text string(s), numerical character(s), alphabetical character(s), alphanumeric code(s), ASCII character(s), and/or the like.

In the present disclosure, the term "project changelog metadata" refers to a type of metadata associated with a project data object that may describe or comprise data and/or information associated with changes of the project data object. In some embodiments, the project changelog metadata may be in the form of text string(s), numerical character(s), alphabetical character(s), alphanumeric code(s), ASCII character(s), and/or the like.

In the present disclosure, the term "project component metadata" refers to a type of metadata associated with a project data object that may describe or comprise data and/or information associated with one or more components of the project data object. In some embodiments, the project component metadata may be in the form of text string(s), numerical character(s), alphabetical character(s), alphanumeric code(s), ASCII character(s), and/or the like.

In the present disclosure, the term "project type metadata" refers to a type of metadata associated with a project data object that may describe or comprise data and/or information associated with a type of the project data object. In some embodiments, the project type metadata may be in the form of text string(s), numerical character(s), alphabetical character(s), alphanumeric code(s), ASCII character(s), and/or the like.

In the present disclosure, the term "project version metadata" refers to a type of metadata associated with a project data object that may describe or comprise data and/or information associated with a version of the project data object. In some embodiments, the project version metadata may be in the form of text string(s), numerical character(s), alphabetical character(s), alphanumeric code(s), ASCII character(s), and/or the like.

In some embodiments, a data object is of a "board data object type" (also described as a "board data object" herein) refers to a type of data object that represents an organized set of project data objects. For example, a board data object may be associated with an issue-based (or project-based) collaborative task management system that operates in a network service cloud. In this example, the board data object may represent and/or comprise data and/or information such as, but not limited to, one or more projects, one or more software applications, one or more virtual IT help-desks, among many other possibilities.

In the present disclosure, the term "board data object type identifier" refers to an identifier that indicates, identifies, or flags a data object as a board data object. In some embodiments, the board data object type identifier may be in the form of text string(s), numerical character(s), alphabetical character(s), alphanumeric code(s), ASCII character(s), and/or the like.

In some embodiments, a data object is of a "sprint data object type" (also described as a "sprint data object" herein) refers to a type of data object that defines or is associated with a fixed time period in a continuous time cycle. For example, a sprint data object may be associated with an issue-based (or project-based) collaborative task management system that operates in a network service cloud. In this example, the sprint data object may represent and/or comprise data and/or information such as, a fixed time period in a continuous product development cycle where teams may complete work from their product backlog.

In the present disclosure, the term "sprint data object type identifier" refers to an identifier that indicates, identifies, or flags a data object as a sprint data object. In some embodiments, the sprint data object type identifier may be in the form of text string(s), numerical character(s), alphabetical character(s), alphanumeric code(s), ASCII character(s), and/or the like.

In the present disclosure, the term "data object repository" refers to one or more network locations (and/or one or more network data storage devices) where one or more data objects are electronically stored. For example, an example data object repository in a network service cloud in accordance with various embodiments of the present disclosure may be configured such that one or more network service server within the network service cloud may query the example data object repository, may retrieve one or more data objects from the example data object repository, and/or may store one or more data objects to the data object repository.

In some embodiments, computing devices that are outside of or external to the network service cloud (such as, but not limited to, client devices, computing devices providing third-party service, and/or the like) may or may not have access (e.g. root access privilege) to data objects stored in a data object repository within the network service cloud, depending on the type of the data object repository.

In the present disclosure, the terms "external-access-limited source data object repository," "external access limited source data object repository," or "external tenant inaccessible source data object repository" refer to a type of data object repository that only provides limited/restricted access to the source data object repository by computing devices that are external to or outside of a network service cloud, and/or is not accessible by computing devices that are external to or outside of a network service cloud, and/or does not provide root access for computing devices that are external to or outside of a network service cloud. For example, an example external-access-limited source data object repository may not establish sufficient (or any) data communication protocol or interface that would provide root access privilege to an external computing device for retrieving/accessing data object from the example external-access-limited source data object repository, and/or may not establish sufficient (or any) data communication protocol or interface that would enable a large amount of data objects to be queried and/or retrieved by computing devices that are external to or outside of a network service cloud. For example, the external computing device outside of the network service cloud may not be able to retrieve data objects from the external-access-limited source data object repository, and may not be able store data objects in the external-access-limited source data object repository.

In contrast, the terms "external-service-accessible replica data object repository," "external service accessible replica data object repository", or "external tenant accessible replica data object repository" refer to a type of data object repository that is accessible to computing devices that are external to or outside of a network service cloud. For example, an example external-service-accessible replica data object repository may establish data communication protocol and/or interface that provide root access to an external computing device for retrieving/accessing data objects from the example external-service-accessible replica data object repository, and/or establish sufficient data communication protocol or interface that would enable a large amount of data objects to be queried and/or retrieved by computing devices that are external to or outside of a network service cloud.

In some embodiments, an example external computing device may transmit a data object access request to a network service cloud. In this example, the data object access request may be associated with one or more data objects stored in the external-service-accessible replica data object repository. In response to the data object access request, the network service cloud may retrieve the data object from the external-service-accessible replica data object repository, and may transmit the data object to the external computing device. As an alternative, the network service cloud may generate a data object access denial message in response to the data object access request, and may transmit the data object access denial message to the external computing device, details of which are described herein.

In the present disclosure, the terms "source data object" or "raw data object" refer to a data object that is stored in an external-access-limited source data object repository in a network service cloud. For example, an example source data object may comprise data and/or information associated with the network service cloud.

In the present disclosure, the term "source data object type identifier" refers to an identifier that identifies a type associated with the source data object. Examples of source data object type identifiers comprise at least a project data object type identifier and an issue data object type identifier. For example, an example source data object identifier may identify whether the corresponding source data object is an issue data object, a project data object, and/or the like. In some embodiments, the source data object type identifier may be in the form of text string(s), numerical character(s), alphabetical character(s), alphanumeric code(s), ASCII character(s), and/or the like.

In the present disclosure, the term "source data object sequence identifier" refers to an identifier that identifies a version or an edition associated with the source data object. In some embodiments, the source data object sequence identifier may be in the form of text string(s), numerical character(s), alphabetical character(s), alphanumeric code(s), ASCII character(s), and/or the like.

In the present disclosure, the term "source data object serial identifier" refers to an identifier that identifies a source data object from other source data object(s) of the same type in an external-access-limited source data object repository, and/or uniquely identifies a source data object from other source data object(s) in the external-access-limited source data object repository regardless of the data object type. In some embodiments, the source data object serial identifier may be in the form of text string(s), numerical character(s), alphabetical character(s), alphanumeric code(s), ASCII character(s), and/or the like.

In the present disclosure, the term "data object replication request" refers to an electronic request to replicate one or more source data objects. For example, a user, operating a client device, may transmit a data object replication request through the client device to the network service cloud. The data object replication request may comprise an electronic request to replicate one or more source data objects associated with the user (for example, based on a tenant identifier associated with the user). In some embodiments, the one or more source data objects are stored in an external-access-limited source data object repository, similar to those described above.

In the present disclosure, the term "replica data object" refers to a data object that is replicated from a source data object, and/or is a duplicate of the source data object in accordance with various embodiments of the present disclosure. In some embodiments, an example replica data object may be generated by a network service server in response to receiving a data object replication request, details of which are described herein. In some embodiments, an example replica data object may be stored in an external-service-accessible replica data object repository, and computing devices that are external to and/or outside of the network service cloud may access or retrieve the example replica data object from the external-service-accessible replica data object repository, similar to those described above.

In the present disclosure, the term "replica data object type identifier" refers to an identifier that identifies a type associated with the replica data object. Examples of replica data object type identifiers comprise at least a project data object type identifier, an issue data object type identifier, and/or other identifiers described above. For example, an example replica data object identifier may identify whether an example replica data object is an issue data object, a project data object, and/or the like. In some embodiments, the replica data object type identifier may be in the form of text string(s), numerical character(s), alphabetical character(s), alphanumeric code(s), ASCII character(s), and/or the like.

In the present disclosure, the term "data object access request" refers to an electronic request to access one or more replica data objects. For example, a user, operating a client device, may transmit a data object access request through the client device to the network service cloud. The data object access request may comprise an electronic request to access one or more replica data objects associated with the user (for example, based on a tenant identifier as defined herein) that are stored in the external-service-accessible replica data object repository.

In the present disclosure, the term "requestor identifier" refers to an identifier that uniquely identifies the sender of an electronic request. For example, an example requestor identifier associated with a data object replication request uniquely identifies the sender of the data object replication request. As another example, an example requestor identifier associated with a data object access request uniquely identifies the sender of the data object access request. In some embodiments, the requestor identifier may be in the form of text string(s), numerical character(s), alphabetical character(s), alphanumeric code(s), ASCII character(s), and/or the like.

In various embodiments of the present discourse, various replica data objects are associated with various replica data object types. For example, as described above, an example replica data object is a replica or a duplicate of an example source data object, and the example source data object is associated with a particular data object type. In this example, the example replica data object is associated with a data object type that is the same as the type of the source data object. In some embodiments, examples of types associated with a replica data object may include, but not limited to, issue data object type, project data object type, and/or the like, similar to those described above.

In some embodiments, a data object of a "tenant data object type" (also described as a "tenant data object" herein) refers to a type of data object that comprises data and/or information associated with a tenant (for example, a user, an organization, etc.) of a network service cloud (such data and/or information including, but not limited to, one or more issue data objects associated with the tenant and/or one or more project data objects associated with the tenant). In some embodiments, an example tenant data object may be generated based at least in part on one or more replica data objects, details of which are described herein.

In the present disclosure, the term "tenant identifier" refers to an identifier that uniquely identifies a tenant (such as, but not limited to, a user, an organization, an enterprise, an entity, and/or the like) of a network service cloud. In some embodiments, a tenant identifier of a tenant data object identifies the owner (e.g. a user, an organization, an enterprise, an entity, etc.) of data and/or information in the tenant data object. In some embodiments, the tenant identifier may be in the form of text string(s), numerical character(s), alphabetical character(s), alphanumeric code(s), ASCII character(s), and/or the like.

In the present disclosure, the term "data object conversion schema" refers to a protocol, a guideline, a blueprint, and/or a plan for converting data object(s) from one data object structure to another data object structure. As described above, data objects may be categorized based on various structures which may be defined based on form or format associated with the corresponding data object. In some embodiments, examples of structures associated with data objects may include, but not limited to, star structures, table structures, and/or the like.

For example, a data object of a "star structure" (also described as an "star-structured data object" herein) refers to a structure of data object that comprises one or more nodes and one or more edges connecting the one or more nodes. As another example, a data object of a "table structure" (also described as an "table-structured data object" herein) refers to a structure of data object that comprises one or more tubular elements.

In some embodiments, an example data object may be categorized based on both the data object type and the data object structure.

For example, the term "star-structured issue data object" refers to a data object that is both an issue data object and a star-structured data object. As another example, the term "star-structured project data object" refers to a data object that is both a project data object and a star-structured data object. As another example, the term "table-structured issue data object" refers to a data object that is both an issue data object and a table-structured data object. As another example, the term "star-structured tenant data object" refers to a data object that is both a tenant data object and a star-structured data object.

In the present disclosure, the term "task object" refers to a data object that comprises one or more computer-executable programming instructions associated with one or more electronic tasks. In some embodiments, when a task object is executed by a computing device (such as, but not limited to, a network service server described herein), the computing device may perform the one or more electronic tasks associated with the task object. Examples of the electronic tasks associated with an example task object include, but not limited to, replicating data objects, monitoring changes associated with data objects, storing data objects in a data object repository, and/or the like.

In the present disclosure, the term "bootstrap task object" refers to a type of task object that represents an electronic task to replicate or duplicate a source data object. For example, when a computing device executes a bootstrap tasks object, the computing device may retrieve a source data object from an external-access-limited source data object repository, and may generate a replicated copy of the source data object.

In the present disclosure, the term "replication data object" refers to a data object that is generated by the computing device after executing a bootstrap task object. Continuing from the example above, the replication data object comprises a replicated copy of a source data object.

In some embodiments, a computing device may generate a replication data object based at least in part on the source data object type identifier associated with the source data object, details of which are described herein.

In the present disclosure, the term "replication data object type identifier" refers to an identifier that identifies a type associated with the replication data object. For example, an example replication data object identifier may identify whether an example replication data object is an issue data object, a project data object, and/or the like. In some embodiments, the replication data object type identifier corresponds to a source data object type identifier associated with a source data object based on which the corresponding replication data object is generated. In some embodiments, the replication data object type identifier may be in the form of text string(s), numerical character(s), alphabetical character(s), alphanumeric code(s), ASCII character(s), and/or the like.

In the present disclosure, the term "replication data object sequence identifier" refers to an identifier that identifies a version or an edition associated with the replication data object. In some embodiments, the replication data object sequence identifier corresponds to a source data object sequence identifier associated with a source data object based on which the corresponding replication data object is generated. In some embodiments, the replication data object sequence identifier may be in the form of text string(s), numerical character(s), alphabetical character(s), alphanumeric code(s), ASCII character(s), and/or the like.

In the present disclosure, the term "replication data object serial identifier" refers to an identifier that corresponds to a source data object serial identifier associated with a source data object based on which the corresponding replication data object is generated. In some embodiments, the replication data object serial identifier may identify a replication data object from another replication data object(s) of the same type, and/or may identify a replication data object from another replication data object(s) regardless of the data object type. In some embodiments, the replication data object serial identifier may be in the form of text string(s), numerical character(s), alphabetical character(s), alphanumeric code(s), ASCII character(s), and/or the like.

In the present disclosure, the terms "change data capture event indication" or "CDC event indication" refers to an electronic indication that data and/or information of a source data object stored in the external-access-limited source data object repository has been changed. For example, an example network service cloud may implement one or more data services to detect changes associated with the source data objects stored in the external-access-limited source data object repository, and the one or more data services may provide a CDC event indication to the network service cloud once a change to the source data object is detected.

In the present disclosure, the terms "change data capture task object" or "CDC task object" refers to a type of task object that represents an electronic task to replicate or duplicate a source data object that has been changed as indicated by a CDC event indication, and/or replicate or duplicate changes associated with the source data object as indicated by a CDC event indication. For example, in response to receiving a CDC event indication, a computing device may execute a CDC task object, and may generate a replicated copy of the changed source data object (or a replicated copy of changes associated with the source data object).

In the present disclosure, the terms "change data capture data object" or "CDC data object" refers to a data object that is generated by the computing device after executing a CDC task object. Continuing from the example above, the CDC data object may comprise a replicated copy of the changed source data object (or a replicated copy of changes associated with the source data object.

In the present disclosure, the terms "change data capture data object type identifier" or "CDC data object type identifier" refer to an identifier that identifies a type associated with the CDC data object. In some embodiments, the CDC data object type identifier corresponds to a source data object type identifier of a source data object associated with a CDC event indication. For example, an example CDC data object identifier may identify whether an example CDC data object is an issue data object, a project data object, and/or the like. In some embodiments, the CDC data object type identifier may be in the form of text string(s), numerical character(s), alphabetical character(s), alphanumeric code(s), ASCII character(s), and/or the like.

In the present disclosure, the terms "change data capture data object sequence identifier" or "CDC data object sequence identifier" refer to a version or an edition associated with the CDC data object. In some embodiments, the CDC data object sequence identifier corresponds to a source data object sequence identifier of a source data object associated with a CDC event indication. In some embodiments, the CDC data object sequence identifier may be in the form of text string(s), numerical character(s), alphabetical character(s), alphanumeric code(s), ASCII character(s), and/or the like.

In the present disclosure, the terms "change data capture data object serial identifier" or "CDC data object serial identifier" refer to an identifier that corresponds to a source data object serial identifier of a source data object associated with a CDC event indication. In some embodiments, the CDC data object serial identifier may uniquely identify a CDC data object from other CDC data object(s) of the same type, and/or may identify a CDC data object from other CDC data object(s) regardless of the data object type. In some embodiments, the CDC data object serial identifier may be in the form of text string(s), numerical character(s), alphabetical character(s), alphanumeric code(s), ASCII character(s), and/or the like.

In the present disclosure, the term "processing queue data object" refers to a data object that represents an organized collection of data objects, including, but not limited to, one or more replication data objects and one or more CDC data objects. In some embodiments, a computing device (such as a network service server described herein) may process the one or more replication data objects and the one or more CDC data object stored in the processing queue data object to generate one or more replica data objects, details of which are described herein.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a network service server and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1A illustrates an example data object replication and/or conversion environment 100 within which embodiments of the present disclosure may operate. In the example shown in FIG. 1A, the data object replication and/or conversion environment 100 may comprise a network service cloud 109 in electronic communication with one or more client devices 101A, 101B, 101C, . . . 101N (for example, via a communication network). In some embodiments, users may access the network service cloud 109 via the communication network using client devices 101A, 101B, . . . 101N.

In some embodiments, the client devices 101A-101N may be a computing device as described herein, including, but not limited to, desktop computers, laptop computers, smartphones, netbooks, tablet computers, wearables, and the like. In some embodiments, the client devices 101A-101N may interact with the network service cloud 109 via a web browser or through a web application that runs in a web browser. As yet another example, the client devices 101A-101N may include various hardware or firmware designed to interface with the network service cloud 109.

In some embodiments, the communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network may include an 802.11, 802.16, 802.20, and/or WiMax network. Further, the communication network may include a public network (such as the Internet), a private network (such as an intranet), or combinations thereof, and may utilize a variety of networking protocols including, but not limited to, TCP/IP based networking protocols. For instance, the networking protocol may be customized to suit the needs of the network service cloud 109 and/or the client devices 101A-101N. In some embodiments, the protocol is a custom protocol of JSON objects sent via a Web Socket channel. In some embodiments, the protocol is JSON over RPC, JSON over REST/HTTP, and the like.

In various embodiments of the present disclosure, electronic data received by the network service cloud 109 from the client devices 101A-101N may be provided in various forms and via various methods. For example, data and information (such as but not limited to, data objects) may be sent to the network service cloud 109 via, for example, the communication network directly by a client device of client devices 101A-101N. Additionally, or alternatively, these data and information (such as but not limited to, data objects) may be sent to network service cloud 109 via one or more intermediaries.

In some embodiments, a client device of client devices 101A-101N that is associated with a tenant identifier may transmit a data object replication request to the network service cloud 109. In some embodiments, the data object replication request comprises an electronic request to replicate source data objects associated with the tenant identifier.

In some embodiments, some of the client devices 101A, 101B, 101C, . . . , 101N may be associated with an organization that is different from the organization associated with other client devices. For example, the client devices 101A, . . . , 101B are associated with a first organization 113A, and the client devices 101C, . . . , 101N are associated with a second organization 113B, as shown in FIG. 1A.

In some embodiments, each of the client devices may comprise one or more software applications (also referred to as "apps") installed on the corresponding client device (such as, but not limited to, app 111A, app 111B, app 111C, app 111D, app 111E, and/or the like). In some embodiments, those apps, when executed, may communicate with one or more other computing devices (such as, but not limited to, one or more computing devices within the network service cloud 109 and/or one or more computing devices outside of the network service cloud 109 (e.g. the network server 117A, the network server 117B)).

In the example shown in FIG. 1A, one or more network servers may be outside of or external to the network service cloud 109, such as, but not limited to, the network server 117A, the network server 117B, and/or the like. In some embodiments, the network server 117A and/or the network server 117B may provide third-party data services that supplement the network service cloud 109. For example, in response to receiving an electronic request from a client (for example, when the client executes the app 111A installed on the client device 101A or from the client device 101A), the network server 117A and/or the network server 117B may communicate with the network service cloud 109 to retrieve data objects from the network service cloud 109, and may generate visualization reports based on the retrieved data objects, implement machine learning models and/or artificial intelligence algorithms to generate one or more predictions based on the retrieved data objects, and/or the like.

In some embodiments, the network service cloud 109 comprises one or more external-access-limited source data object repositories (such as, but not limited to, the external-access-limited source data object repository 103A, . . . , and/or the external-access-limited source data object repository 103N in the example shown in FIG. 1A). In some embodiments, the source data objects associated with the tenant identifier (for example, received from client devices such as, but not limited to, client devices 101A, 101B, . . . , 101N) may be stored in one or more external-access-limited source data object repositories (such as, but not limited to, the external-access-limited source data object repository 103A, . . . , and/or the external-access-limited source data object repository 103N in the example shown in FIG. 1A). In some embodiments, the data object replication request may comprise an electronic request to replicate and/or convert one or more data objects associated with the tenant identifier that are stored in the one or more external-access-limited source data object repositories to one (or more) external-service-accessible replica data object repositories (such as, but not limited to, the external-service-accessible replica data object repository 105 in the example shown in FIG. 1A).

In some embodiments, the network service cloud 109 comprises one or more network service servers (such as, but not limited to, the network service server 107 in the example shown in FIG. 1A). In some embodiments, each of the one or more network service servers is in electronic communications with one or more external-access-limited source data object repositories (such as, but not limited to, the external-access-limited source data object repository 103A, . . . , and/or the external-access-limited source data object repository 103N in the example shown in FIG. 1A), one or more external-service-accessible replica data object repositories (such as, but not limited to, the external-service-accessible replica data object repository 105 in the example shown in FIG. 1A), and/or one or more other network service servers.

For example, in the example shown in FIG. 1A, the network service server 107 is in electronic communications with the external-access-limited source data object repository 103A, . . . , and/or the external-access-limited source data object repository 103N, as well as the external-service-accessible replica data object repository 105. For example, the network service server 107 may retrieve data and/or information associated with one or more source data objects stored in the one or more external-access-limited source data object repository 103A, . . . , and/or the external-access-limited source data object repository 103N, and may generate and store one or more replica data objects in the external-service-accessible replica data object repository 105.

For example, based on the data object replication request, one or more network service servers (such as the network service server 107 in the example shown in FIG. 1A) may generate a plurality of bootstrap task objects and at least one change data capture (CDC) task object to facilitate data object replication, details of which are described herein. In some embodiments, one or more network service servers (such as the network service server 107 in the example shown in FIG. 1A) may generate a plurality of replica data objects corresponding to the plurality of source data objects stored in the one or more external-access-limited source data object repositories, such as, but not limited to, the external-access-limited source data object repository 103A, . . . , and/or the external-access-limited source data object repository 103N in the example shown in FIG. 1A. In some embodiments, one or more network service servers (such as the network service server 107 in the example shown in FIG. 1A) may store the plurality of replica data objects in one (or more) external-service-accessible replica data object repositories (such as, but not limited to, the external-service-accessible replica data object repository 105 in the example shown in FIG. 1A), details of which are described herein.

Additionally, or alternatively, in some embodiments, one or more network service servers (such as the network service server 107 in the example shown in FIG. 1A) may convert the replica data object(s) stored in the one (or more) external-service-accessible replica data object repositories (such as, but not limited to, the external-service-accessible replica data object repository 105 in the example shown in FIG. 1A). For example, the one or more network service servers (such as the network service server 107 in the example shown in FIG. 1A) may convert the replica data object(s) based at least in part on replica data object type(s) associated with the replica data object(s) and one or more data object conversion schemas, details of which are described herein.

In some embodiments, a client device of client devices 101A-101N or a network server that is outside of or external to the network service cloud 109 may transmit a data object access request to the network service cloud 109, which comprises an electronic request to access replica data objects stored in the one or more external-service-accessible replica data object repositories of the network service cloud 109 (for example, but not limited to, the external-service-accessible replica data object repository 105 in the example shown in FIG. 1A). In some embodiments, the one or more network service servers (such as the network service server 107 in the example shown in FIG. 1A) may handle the data object access request based at least in part on whether the data object access request is associated with a requestor identifier that matches the tenant identifier associated with the data object, details of which are described herein.

While the description above provides an example illustration of network service cloud, it is noted that the scope of the present disclosure is not limited to the description above.

For example, the number of external-access-limited source data object repositories in an example network service cloud may be more or less than that of the example shown in FIG. 1A. Additionally, or alternatively, the number of network service servers in an example network service cloud may be more than that of the example shown in FIG. 1A. Additionally, or alternatively, the number of external-access-limited source data object repositories in an example network service cloud may be more than that of the example shown in FIG. 1A.

Additionally, or alternatively, in response to receiving a data object replication request, one or more network service servers may retrieve source data objects from a single external-access-limited source data object repository, and generate and store replica data objects in a signal external-service-accessible replica data object repository. Additionally, or alternatively, in response to receiving a data object replication request, one or more network service servers may retrieve source data objects from multiple external-access-limited source data object repositories, and generate and store replica data objects in a signal external-service-accessible replica data object repository. Additionally, or alternatively, in response to receiving a data object replication request, one or more network service servers may retrieve source data objects from a single external-access-limited source data object repository, and generate and store replica data objects in multiple external-service-accessible replica data object repositories. Additionally, or alternatively, in response to receiving a data object replication request, one or more network service servers may retrieve source data objects from multiple external-access-limited source data object repositories, and generate and store replica data objects in multiple external-service-accessible replica data object repositories.

It is noted that various components of the data object replication and/or conversion environment 100 may leverage the same computer or computing apparatus to perform various operations. For example, various components of one or more network service servers (such as, but not limited to, the network service server 107 in the example shown in FIG. 1A), one or more external-access-limited source data object repositories (such as, but not limited to, the external-access-limited source data object repository 103A, . . . and/or the external-access-limited source data object repository 103N in the example shown in FIG. 1A), and/or more external-service-accessible replica data object repositories (such as, but not limited to, the external-service-accessible replica data object repository 105 in the example shown in FIG. 1A) in the network service cloud 109 may leverage the same computer or computing apparatus to perform various operations.

Referring now to FIG. 1B, an example system architecture diagram is illustrated. In the example shown in FIG. 1B, the example system architecture diagram illustrates various example distributed layers and example functional components associated with the network service server, as well as example data communications between various layers and/or components.

In the example shown in FIG. 1B, the network service server 107 may comprise various distributed layers to carry out various operations described herein. For example, the network service server 107 may comprise a data processing layer 107A, a data management layer 107B, and a data interface layer 107C.

In some embodiments, the data processing layer 107A may be configured to retrieve data objects from various data sources, such as, but not limited to, the external-access-limited source data object repository 103A, . . . and/or the external-access-limited source data object repository 103N described herein. In some embodiments, the data processing layer 107A may comprise a raw data module 119 that stores data objects retrieved from the external-access-limited source data object repository 103A, . . . and/or the external-access-limited source data object repository 103N. In some embodiments, the data processing layer 107A may comprise a spark streaming/batch jobs module 121 that detects new data objects in the raw data module 119, and generates electronic tasks for replicating and/or converting these data objects. The spark streaming/batch jobs module 121 may store the converted data objects in the refined/modeled data module 123, which in turn may provide such data objects to the external-service-accessible replica data object repository 105.

In some embodiments, the data interface layer 107C may comprise a lake provisioning service module 133. In some embodiments, the lake provisioning service module 133 may receive tenant update data 137 that indicates one or more updates or changes associated with the data objects. In some embodiments, the lake provisioning service module 133 may trigger the job orchestration/cluster management module 127, which may orchestrate and/or cluster tasks associated with the network service server 107 (for examples, tasks to update the data objects based on the tenant update data 137 and/or tasks to replicate and/or convert data objects associated with the spark streaming/batch jobs module 121). In some embodiments, the lake provisioning service module 133 may trigger the table/user management module 129, which may manage data and/or information associated with the tenants of the network service cloud.

As described above, in some embodiments, a client may execute an app on a client device to communicate with one or more network servers outside of the network service cloud, and the one or more network servers may communicate with the network service cloud (for example, in the form of database queries) to request data objects from the network service cloud and may perform tasks such as, but not limited to, generating visualization reports based on the requested data objects, implementing machine learning models and/or artificial intelligence algorithms to generate one or more predictions based on the requested data objects, and/or the like.

For example, as shown in FIG. 1B, the data processing layer 107A may comprise a query cluster pool module 125 that receives database queries from one or more network servers outside of the network service cloud (for example, the network server 117A). The query cluster pool module 125 may retrieve corresponding data objects from the external-service-accessible replica data object repository 105. The query cluster pool module 125 may communicate with the load-balanced SQL endpoint module 131 in the data management layer 107B, which may balance processing loads associated with the database queries. The load-balanced SQL endpoint module 131 may provide the retrieved corresponding data objects to the query proxy module 135 in the data interface layer 107C, which in turn may transmit the data objects to the network server external to the network service cloud (for example, the network server 117A).

Example Apparatuses for Implementing Embodiments of the Present Disclosure

The client devices 101A, 101B, 101C, . . . , 101N of FIG. 1A may include one or more computing systems, such as the apparatus 200 shown in FIG. 2. The apparatus 200 may be configured to execute at least some of the operations described above with respect to FIG. 1A and below with respect to FIG. 4 to FIG. 15. The apparatus 200 may include a processor 206, a memory 202, an input/output circuitry 208, a communications circuitry 210, and/or a display 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 206 (and/or co-processor or any other processing circuitry assisting or otherwise associated with the processor) may be in communication with the memory 202 via a bus for passing information among components of the apparatus. The memory 202 may be non-transitory and may include, for example, one or more volatile and/or non-volatile memories. In other words, for example, the memory 202 may be an electronic storage device (e.g., a computer readable storage medium). The memory 202 may be configured to store information, data, content, applications, instructions, or the like, for enabling the apparatus 200 to carry out various functions in accordance with example embodiments of the present disclosure.

The processor 206 may be embodied in a number of different ways and may, for example, include one or more processing devices configured to perform independently. Additionally, or alternatively, the processor 206 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 206 may be configured to execute instructions stored in the memory 202 or otherwise accessible to the processor. Alternatively, or additionally, the processor 206 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 206 is embodied as an executor of software instructions, the instructions may specifically configure the processor to perform the algorithms and/or operations described herein when the instructions are executed.

In some embodiments, the apparatus 200 may include the input/output circuitry 208 that may, in turn, be in communication with the processor 206 to provide output to the user and, in some embodiments, to receive an indication of a user input. The input/output circuitry 208 may comprise a user interface circuitry and may include a display, which may comprise a web user interface, a mobile application, a client device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 202, and/or the like).

In some embodiments, the apparatus 200 may include the display 204 that may, in turn, be in communication with the processor 206 to display renderings of card data object rendering interfaces. In various examples of the present disclosure, the display 204 may include a liquid crystal display (LCD), a light-emitting diode (LED) display, a plasma (PDP) display, a quantum dot (QLED) display, and/or the like.

The communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The network service server 107 of FIG. 1A and FIG. 1B may be embodied by one or more computing systems, such as apparatus 300 shown in FIG. 3. The apparatus 300 may include a processor 305, a memory 301, an input/output circuitry 307, and a communications circuitry 303. The apparatus 300 may be configured to execute the operations described above with respect to FIG. 1A and FIG. 1B and below with respect to FIG. 4 to FIG. 15. Although these components 301, 303, 305, and 307 are described with respect to functional limitations, it should be understood that the particular implementations necessarily include the use of particular hardware. It should also be understood that certain of these components 301, 303, 305, and 307 may include similar or common hardware. For example, two sets of circuitries may both leverage use of the same processor, network interface, storage medium, or the like to perform their associated functions, such that duplicate hardware is not required for each set of circuitries.

In some embodiments, the processor 305 (and/or coprocessor or any other processing circuitry assisting or otherwise associated with the processor) may be in communication with the memory 301 via a bus for passing information among components of the apparatus. The memory 301 is non-transitory and may include, for example, one or more volatile and/or non-volatile memories. In other words, for example, the memory 301 may be an electronic storage device (e.g., a computer-readable storage medium). The memory 301 may be configured to store information, data, content, applications, instructions, or the like for enabling the apparatus to carry out various functions in accordance with example embodiments of the present disclosure.

The processor 305 may be embodied in a number of different ways and may, for example, include one or more processing devices configured to perform independently. In some examples, the processor 305 may include one or more processors configured in tandem via a bus to enable independent execution of instructions, pipelining, and/or multi-threading. The use of the term "processor" or "processing circuitry" may be understood to include a single core processor, a multi-core processor, multiple processors internal to the apparatus, and/or remote or "cloud" processors.

In some examples, the processor 305 may be configured to execute instructions stored in the memory 301 or otherwise accessible to the processor 305. In some examples, the processor 305 may be configured to execute hard-coded functionalities. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

In some embodiments, the apparatus 300 may include the input/output circuitry 307 that may, in turn, be in communication with the processor 305 to provide output to the user and, in some embodiments, to receive an indication of a user input. The input/output circuitry 307 may comprise a user interface circuitry and may include a display, which may comprise a web user interface, a mobile application, a client device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 301, and/or the like).

The communications circuitry 303 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 303 may include, for example, a network interface for enabling communications with a wired or wireless communication network (such as the communication network described above in connection with FIG. 1A and FIG. 1B). For example, the communications circuitry 303 may include one or more network interface cards, antennae, buses, switches, routers, modems, and supporting hardware and/or software, or any other device suitable for enabling communications via a network. Additionally, or alternatively, the communications circuitry 303 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

In some embodiments, other elements of the apparatus 300 may provide or supplement the functionality of particular circuitry. For example, the processor 305 may provide processing functionality, the memory 301 may provide storage functionality, the communications circuitry 303 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

Example Methods for Implementing Embodiments of the Present Disclosure

Various example methods described herein, including, for example, those as shown in FIG. 4 to FIG. 15, provide various technical advantages and/or technical improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 4 to FIG. 15 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Replicating Data Object

Referring now to FIG. 4, an example method 400 is illustrated. In particular, the example method 400 illustrates examples of dynamically replicating data objects and storing data objects in accordance with example embodiments of the present disclosure.

As shown in FIG. 4, the example method 400 starts at step/operation 402 and then proceeds to step/operation 404. At step/operation 404, a processing circuitry (such as the processor 305 of the network service server 107 described above in connection with FIG. 1A, FIG. 1B, and FIG. 3) may receive a data object replication request.

In some embodiments, the processing circuitry may receive a data object replication request associated with a tenant identifier. In some embodiments, the tenant identifier is associated with an external-access-limited source data object repository. In some embodiments, the external-access-limited source data object repository comprises a plurality of source data objects associated with a plurality of source data object type identifiers.

As an example, the processing circuitry may receive a data object replication request from a client device external to the network service cloud or from another network service server within the network service cloud. In this example, the data object replication request may be associated with a tenant identifier related to a tenant of the network service cloud (for example, John). The data object replication request may indicate an electronic request to replicate one or more source data objects associated with the tenant identifier (for example, data objects related to and/or associated with John) that are stored in an external-access-limited source data object repository (for example, one or more of the external-access-limited source data object repository 103A, . . . external-access-limited source data object repository 103N described above in connection with FIG. 1A and FIG. 1B). In this example, the tenant identifier is associated with the external-access-limited source data object repository as the external-access-limited source data object repository stored one or more source data objects related to the tenant identifier.

Continuing from the example above, the one or more source data objects stored in the external-access-limited source data object repository may be of one or more different source data object types and/or be associated with a plurality of source data object type identifiers. For example, the one or more source data objects may comprise one or more issue data objects and/or one or more project data objects that are associated with the tenant identifier (for example, John). As an example, the one or more source data objects may comprise one or more issue data objects that represent data and/or information associated with one or more to-do items associated with the user John, one or more software application bugs that are assigned to John for solutions, one or more virtual IT help-desk tickets assigned to John, and/or the like. Additionally, or alternatively, the one or more source data objects may comprise one or more project data objects that represent data and/or information associated with one or more projects that are assigned to and/or associated with John, one or more virtual IT help-desks that John is responsible for, and/or the like.

While the description above provides an example of a tenant identifier associated with an individual user, it is noted that the scope of the present disclosure is not limited to the description above. In some examples, an example data object replication request may be associated with a tenant identifier that corresponds to an organization, an enterprise, and/or the like. In such examples, the data object replication request may indicate an electronic request to replicate data objects that are stored in the external-access-limited source data object repository and associated with the organization or the enterprise.

Referring back to FIG. 4, subsequent to step/operation 404, the method 400 proceeds to step/operation 406. At step/operation 406, a processing circuitry (such as the processor 305 of the network service server 107 described above in connection with FIG. 1A, FIG. 1B, and FIG. 3) may generate a plurality of bootstrap task objects and at least one change data capture (CDC) task object.

In some embodiments, the processing circuitry may generate the plurality of bootstrap task objects and the at least one CDC task object in response to the data object replication request received at step/operation 404.

In some embodiments, the plurality of bootstrap task objects represent a plurality of electronic tasks for replicating the plurality of source data objects associated with the data object replication request received at step/operation 404. For example, the plurality of bootstrap task objects represent a plurality of electronic tasks for replicating source data objects that are stored in one or more external-access-limited source data object repositories in the network service cloud (for example, the external-access-limited source data object repository 103A, . . . , and/or the external-access-limited source data object repository 103N in the example shown in FIG. 1A and FIG. 1B) and are associated with a tenant identifier indicated by the data object replication request received at step/operation 404.

In some embodiments, the plurality of bootstrap task objects may represent a plurality of electronic tasks for replicating the plurality of source data objects in accordance with a plurality of source data object type identifiers. In some embodiments, each of the plurality of source data object type identifiers is associated with one of the plurality of bootstrap task objects.

For example, the plurality of source data objects may be associated with a plurality of source data object type identifiers, and the processing circuitry may generate a bootstrap task object for each source data object type identifier. As an example, the plurality of source data object type identifiers comprises at least a project data object type identifier and an issue data object type identifier, and the processing circuitry may generate a bootstrap task object for one or more source data objects associated with an issue data object type identifier, a bootstrap task object for one or more source data object associated with a project data object type identifier, and/or the like.

As described above, various data objects can be categorized based on various data object types, and the processing circuitry may generate a bootstrap task object for data objects associated with a particular data object type (e.g. based on the data object type identifier). For example, the processing circuitry may generate a bootstrap task object for source data objects that are associated with the issue data object type (e.g. source data objects that are associated with issue data object type identifiers). Additionally, or alternatively, the processing circuitry may generate a bootstrap task object for source data objects that are associated with the project data object type (e.g. source data objects that are associated with project data object type identifiers). Additionally, or alternatively, the processing circuitry may generate a bootstrap task object for source data objects that are associated with the board data object type (e.g. source data objects that are associated with board data object type identifiers). Additionally, or alternatively, the processing circuitry may generate a bootstrap task object for source data objects that are associated with the sprint data object type (e.g. source data objects that are associated with sprint data object type identifiers).

Referring back to FIG. 4, subsequent to step/operation 406, the method 400 proceeds to step/operation 408. At step/operation 408, a processing circuitry (such as the processor 305 of the network service server 107 described above in connection with FIG. 1A, FIG. 1B, and FIG. 3) may execute the plurality of bootstrap task objects.

In some embodiments, the processing circuitry may execute the plurality of bootstrap task objects to generate a plurality of replication data objects corresponding to the plurality of source data objects, and to store the plurality of replication data objects to a processing queue data object. As described above, each of the plurality of replication data objects comprises a replicated copy of a source data object.

In some embodiments, when executing the plurality of bootstrap task objects, the processing circuitry replicates the plurality of source data objects associated with the data object replication request received at step/operation 404. For example, the processing circuitry may query one or more external-access-limited source data object repositories in the network service cloud (for example, the external-access-limited source data object repository 103A, . . . , and/or the external-access-limited source data object repository 103N in the example shown in FIG. 1A and FIG. 1B) based on the tenant identifier, may retrieve one or more source data objects associated with the tenant identifier from the one or more external-access-limited source data object repositories, may replicate or duplicate the one or more source data objects, and may store the one or more source data objects in the processing queue data object.

In some embodiments, when executing the plurality of bootstrap task objects, the processing circuitry may replicate the plurality of source data objects in accordance with their source data object type identifiers. For example, the plurality of source data objects may be associated with the plurality of source data object type identifiers comprising at least a project data object type identifier and an issue data object type identifier. In such an example, the processing circuitry may replicate or duplicate data objects associated with project data object type identifiers separate from replicating or duplicating data objects associated with issue data object type identifiers.

In some examples, a large number of users (and time) are correlated with a large number of project data objects and/or issue date objects, and the data object repository storing these data objects that are to be replicated can be large. Replicating a large data object repository can affect the operation of an underlying data object repository. As such, example embodiments of the present disclosure may programmatically and/or dynamically generate and/or determine the rate of generating and/or executing the bootstrap task objects so as to avoid overloading the data object repository. For example, various examples of the present disclosure may implement techniques such as, but not limited to, rate-limiting the bootstrapping operations and as well as other load mitigating strategies (such as pagination with a cursor at a limited rate).

In some embodiments, due to complexities of the underlying technologies and the size of the data objects in the data object repository, bootstrapping as well as the near-real time replication stream may need to be staged in a large data object store rather than being transmitted as serialized data in a simple queue service.

As such, various embodiments of the present disclosure overcome various technical challenges associated with replicating data objects that are associated with an organization having a large number of users.

Referring back to FIG. 4, subsequent to step/operation 406, the method 400 proceeds to step/operation 410. At step/operation 410, a processing circuitry (such as the processor 305 of the network service server 107 described above in connection with FIG. 1A, FIG. 1B, and FIG. 3) may execute at least one CDC task object.

In some embodiments, the processing circuitry may execute the at least one CDC task object in response to receiving at least one CDC event indication associated with at least one of the plurality of source data objects associated with the data object replication request received at step/operation 404. In some embodiments, when executing the at least one CDC task object, the processing circuitry may generate at least one CDC data object based on the at least one CDC event indication. In some embodiments, the processing circuitry may store at least one CDC data object to the processing queue data object.

As described above, a CDC event indication may comprise an electronic indication that data and/or information associated with a source data object stored in the external-access-limited source data object repository has been changed. In some embodiments, in response to receiving a CDC event indication, the processing circuitry may determine whether the source data object(s) associated with the CDC event indication is related to the data object replication request received at step/operation 404.

For example, the processing circuitry may determine whether the source data object(s) associated with the CDC event indication is also associated with the tenant identifier corresponding to the data object replication request received at step/operation 404.

If the source data object(s) associated with the CDC event indication is also associated with the tenant identifier corresponding to the data object replication request, the processing circuitry may execute the at least one CDC task object to generate at least one CDC data object. As described above, the at least one CDC data object may comprise a replicated copy of the changed source data object (or a replicated copy of changes associated with the source data object).

If the source data object(s) associated with the CDC event indication is not associated with the tenant identifier corresponding to the data object replication request, the processing circuitry may forgo executing the at least one CDC task object.

Additional details associated with executing the at least one CDC task object are described herein, including, but not limited to, those described in connection with at least FIG. 5.

Referring back to FIG. 4, subsequent to step/operation 408 and/or step/operation 410, the method 400 proceeds to step/operation 412. At step/operation 412, a processing circuitry (such as the processor 305 of the network service server 107 described above in connection with FIG. 1A, FIG. 1B, and FIG. 3) may generate a plurality of replica data objects.

In some embodiments, the processing circuitry may generate the plurality of replica data objects corresponding to the plurality of source data objects associated with the data object replication request received at step/operation 404. In some embodiments, the processing circuitry may generate the plurality of replica data objects based at least in part on processing the plurality of replication data objects and the at least one CDC data object stored to the processing queue data object. As described above, each of the plurality of replication data objects may comprise a replicated copy of a source data object. Each of the CDC data objects may comprise a replicated copy of a changed source data object as indicated by the CDC event indication. In some embodiments, the processing circuitry may determine whether to designate a replication data object or a CDC data object as a replica data object corresponding to a source data object associated with the data object replication request received at step/operation 404. Additional details are described herein, including, but not limited to, those described in connection with at least FIG. 6.

Referring back to FIG. 4, subsequent to step/operation 412, the method 400 proceeds to step/operation 414. At step/operation 414, a processing circuitry (such as the processor 305 of the network service server 107 described above in connection with FIG. 1A, FIG. 1B, and FIG. 3) may store the plurality of replica data objects.

In some embodiments, the processing circuitry may store the plurality of replica data objects in an external-service-accessible replica data object repository. For example, the processing circuitry may store the plurality of replica data objects in the external-service-accessible replica data object repository 105 illustrated and described above in connection with FIG. 1A and FIG. 1B.

As described above, the external-service-accessible replica data object repository is accessible to computing devices that are external to or outside of the network service cloud. For example, a client device or a server outside of the network service cloud may transmit a data object access request to request access of one or more replica data objects that are stored in the external-service-accessible replica data object repository. In response to receiving the data object access request, the processing circuitry may determine whether to grant the request based on a requestor identifier, details of which are described herein, including, but not limited to, those described in connection with at least FIG. 15.

As such, the example method 400 provides an example of dynamically replicating source data objects stored in an external-access-limited source data object repository to generate replica data objects, and storing the replica data objects in an external-service-accessible replica data object repository such that the replica data objects can be accessed by computing devices that are external to the network service cloud (such as, but not limited to, third-party computing devices providing data services supplemental to the network service cloud).

Referring back to FIG. 4, subsequent to step/operation 414, the method 400 proceeds to step/operation 416 and ends.

Referring now to FIG. 5, an example method 500 is illustrated. In particular, the example method 500 illustrates examples of executing at least one CDC task object in accordance with example embodiments of the present disclosure.

As shown in FIG. 5, the example method 500 starts at step/operation 501 and then proceeds to step/operation 503. At step/operation 503, a processing circuitry (such as the processor 305 of the network service server 107 described above in connection with FIG. 1A, FIG. 1B, and FIG. 3) may monitor for at least one CDC event indication.

As described above in connection with at least step/operation 406 of FIG. 4, the processing circuitry may generate at least one CDC task object. In some embodiments, the at least one CDC task object represents an electronic task for monitoring the at least one CDC event indication associated with the at least one of the plurality of source data objects stored in one or more external-access-limited source data object repositories.

For example, the network service cloud may comprise one or more network service servers that are in electronic communication with one or more external-access-limited source data object repositories in the network service cloud (for example, the external-access-limited source data object repository 103A, . . . , and/or the external-access-limited source data object repository 103N in the example shown in FIG. 1A and FIG. 1B). In some embodiments, the one or more network service servers may detect changes to source data objects stored in the one or more external-access-limited source data object repositories. In some embodiments, upon detecting the changes, the one or more network service servers may generate a CDC event indication, and may transmit the CDC event indication to the processing circuitry that is monitoring for CDC event indication at step/operation 503.

Referring back to FIG. 5, subsequent to step/operation 503, the method 500 proceeds to step/operation 505. At step/operation 505, a processing circuitry (such as the processor 305 of the network service server 107 described above in connection with FIG. 1A, FIG. 1B, and FIG. 3) may determine whether at least one CDC event indication is received.

In some embodiments, the processing circuitry may determine whether at least one CDC event indication corresponding to a source data object associated with a data object replication request has been received (similar to those described above in connection with at least step/operation 410 of FIG. 4).

If, at step/operation 505, the processing circuitry determines that at least one CDC event indication has not been received, the example method 500 returns to step/operation 503. In this example, the processing circuitry continues monitoring and waiting for an CDC event indication.

If, at step/operation 505, the processing circuitry determines that at least one CDC event indication has been received, the example method 500 proceeds to step/operation 507. At step/operation 507, a processing circuitry (such as the processor 305 of the network service server 107 described above in connection with FIG. 1A, FIG. 1B, and FIG. 3) executes at least one CDC task object.

In some embodiments, the CDC event indication triggers executing the at least one CDC task object. As described above, the CDC task object represents an electronic task to replicate or duplicate a source data object that has been changed as indicated by a CDC event indication, and/or replicate or duplicate changes associated with the source data object as indicated by a CDC event indication. In some embodiments, when executing the CDC task object, the processing circuitry may generate one or more CDC data objects that comprise a replicated copy of the changed source data object (or a replicated copy of changes associated with the source data object), similar to those described herein.

Referring back to FIG. 5, subsequent to step/operation 507, the example method 500 proceeds to step/operation 509 and ends.

Referring now to FIG. 6, an example method 600 is illustrated. In particular, the example method 600 illustrates examples of dynamically replicating data objects and storing data objects in accordance with example embodiments of the present disclosure.

As described above, various embodiments of the present disclosure may replicate a plurality of source data objects in response to receiving a data object replication request. In some embodiments, each source data object of the plurality of source data objects is associated with a source data object serial identifier and a source data object sequence identifier. In some embodiments, the processing circuitry may dynamically replicate data objects based at least in part on the serial identifiers and the sequence identifiers.

As shown in FIG. 6, the example method 600 starts at step/operation 602 and then proceeds to step/operation 604. At step/operation 604, a processing circuitry (such as the processor 305 of the network service server 107 described above in connection with FIG. 1A, FIG. 1B, and FIG. 3) may retrieve a replication data object from the processing queue data object.

In some embodiments, the processing circuitry may generate one or more replication data objects when executing one or more bootstrap task objects, similar to those described above in connection with at least step/operation 406 and step/operation 408 of FIG. 4. For example, the processing circuitry may generate a plurality of bootstrap task objects in response to a data object replication request, and may execute the plurality of bootstrap task objects to generate and store one or more replication data objects in a processing queue data object, similar to those described above.

In some embodiments, each of the plurality of replication data objects stored in the processing queue data object is associated with a replication data object serial identifier and a replication data object sequence identifier. As described above, a replication data object serial identifier refers to an identifier that identifies a replication data object from other replication data object(s) of the same type, and/or uniquely identifies a replication data object from other replication data object(s) regardless of the data object type. As described above, a replication data object sequence identifier refers to an identifier that identifies a version or an edition associated with the replication data object.

As described above, a replication data object comprises a replicated copy of a source data object. As such, the replication data object serial identifier of the corresponding replication data object corresponds to a source data object serial identifier of one of the plurality of source data objects, and the replication data object sequence identifier of the replication data object corresponds to a source data object sequence identifier of one of the plurality of source data objects.

As an example, an example bootstrap task object generated by the processing circuitry and in response to a data object replication request may represent an electronic task to replicate or duplicate a source data object associated with a source data object serial identifier indicating a unique serial number a867b and a source data object sequence identifier indicating a unique sequence number 1.4. In this example, the processing circuitry may execute the bootstrap task object and generate a replication data object corresponding to the source data object. The resultant replication data object is associated with a replication data object serial identifier indicating the unique serial number a867b and a replication data object sequence identifier indicating the unique sequence number 1.4, which are the same as those of the source data object.

Referring back to FIG. 6, subsequent to step/operation 604, the method 600 proceeds to step/operation 606. At step/operation 606, a processing circuitry (such as the processor 305 of the network service server 107 described above in connection with FIG. 1A, FIG. 1B, and FIG. 3) may determine whether the replication data object serial identifier matches CDC data object serial identifier.

As described above in connection with at least step/operation 406 and step/operation 410 of FIG. 4, the processing circuitry may generate one or more CDC task objects, and may execute the one or more CDC task objects in response to receiving a CDC event indication. When executing the at least one CDC task object, the processing circuitry may generate at least one CDC data object based on the at least one CDC event indication, and may store the at least one CDC data object to the processing queue data object.

In some embodiments, the at least one CDC data object is associated with at least one CDC data object serial identifier and at least one CDC data object sequence identifier based at least in part on the at least one CDC event indication. As described above, an example CDC data object sequence identifier may identify a version or an edition associated with the CDC data object, and an example CDC data object serial identifier may identify a CDC data object from other CDC data object(s) of the same type, and/or may identify a CDC data object from other CDC data object(s) regardless of the data object type.

As an example, at least one CDC event indication may indicate that changes have been made to a source data object associated with a source data object serial identifier indicating a unique serial number of b987d and a source data object sequence identifier indicating a unique sequence number of 2.1. In this example, the processing circuitry may execute a CDC task object in response to the CDC event indication, and generate a CDC data object based on the CDC event indication. The resultant CDC data object is associated with a CDC data object serial identifier indicating the serial number b987d and a CDC data object sequence identifier indicating the sequence number of 2.1, which are the same as those indicated in the CDC event indication.

As described above, the processing circuitry may determine whether a corresponding replication data object serial identifier of the corresponding replication data object matches a corresponding CDC data object serial identifier of a corresponding CDC data object.

For example, subsequent to retrieving the replication data object from the processing queue data object at step/operation 604, the processing circuitry may query the processing queue data object, and determine whether the processing queue data object comprises at least one CDC data object. If the processing queue data object does not comprise any CDC data object, the processing circuitry determines that the replication data object serial identifier does not match the CDC data object serial identifier (as there is no CDC data object), and the example method proceeds to step/operation 608.

If the processing circuitry determines that the processing queue data object comprises at least one CDC data object, the processing circuitry may retrieve the at least one CDC data object form the processing queue data object, and may determine whether the replication data object serial identifier of the replication data object retrieved at step/operation 604 matches a CDC data object serial identifier of the retrieved CDC data object.

As an example, the replication data object serial identifier of the replication data object retrieved at step/operation 604 may indicate a unique serial number a867b, and the CDC data object serial identifier of the retrieved CDC data object may indicate unique serial number of b987d. In this example, the processing circuitry determines that the replication data object serial identifier does not match the CDC data object serial identifier, and the example method proceeds to step/operation 608.

As another example, the replication data object serial identifier of the replication data object retrieved at step/operation 604 may indicate a unique serial number a867b, and the CDC data object serial identifier of the retrieved CDC data object may indicate a unique serial number a867b. In this example, the processing circuitry determines that the replication data object serial identifier matches the CDC data object serial identifier, and the example method proceeds to step/operation 610.

In some embodiments, the processing queue data object may comprise multiple CDC data objects. In such example embodiments, the processing circuitry may compare each CDC data object serial identifier of each CDC data object with the replication data object serial identifier of the replication data object retrieved at step/operation 604, and may determine whether any CDC data object serial identifier matches the replication data object serial identifier. If any of the CDC data object serial identifiers matches the replication data object serial identifier, the example method 600 proceeds to step/operation 610. If none of the CDC data object serial identifiers matches the replication data object serial identifier, the example method 600 proceeds to step/operation 608.

Referring back to FIG. 6, if, at step/operation 606, the processing circuitry determines that the replication data object serial identifier does not match the CDC data object serial identifier, the example method 600 proceeds to step/operation 608. At step/operation 608, a processing circuitry (such as the processor 305 of the network service server 107 described above in connection with FIG. 1A, FIG. 1B, and FIG. 3) may store the corresponding replication data object as one of the plurality of replica data objects.

In some embodiments, based on determining that the replication data object serial identifier does not match the CDC data object serial identifier, the processing circuitry determines that there is no change to the source data object (as otherwise there would be a corresponding CDC data object).

As such, the processing circuitry may store the replication data object as one of the plurality of replica data objects (e.g. corresponding to a source data object associated with the same serial identifier) in an external-service-accessible replica data object repository (such as, but not limited to, the example external-service-accessible replica data object repository 105 illustrated and described above in connection with FIG. 1A and FIG. 1B) in response to determining that the corresponding replication data object serial identifier does not match any CDC data object type identifier of any CDC data object in the processing queue data object.

Referring back to FIG. 6, subsequent to step/operation 608, the example method 600 proceeds to step/operation 616 and ends.

Referring back to step/operation 606, if the processing circuitry determines that the replication data object serial identifier matches the CDC data object serial identifier, the example method 600 proceeds to step/operation 610. At step/operation 610, a processing circuitry (such as the processor 305 of the network service server 107 described above in connection with FIG. 1A, FIG. 1B, and FIG. 3) may determine whether the replication data object sequence identifier satisfies CDC data object sequence identifier.

In some embodiments, the processing circuitry may determine whether a corresponding replication data object sequence identifier of the corresponding replication data object satisfies a corresponding CDC data object sequence identifier of the corresponding CDC data object in response to determining that the corresponding replication data object type identifier matches the corresponding CDC data object type identifier at step/operation 606.

As described above, the replication data object sequence identifier may identify a version or an edition associated with the replication data object, and the CDC data object sequence identifier may identify a version or an edition associated with the CDC data object. In some embodiments, the processing circuitry may determine whether the replication data object sequence identifier satisfies CDC data object sequence identifier based on whether the version/edition number indicated by the replication data object sequence identifier is higher than the version/edition number indicated by the CDC data object sequence identifier. In this example, if the version/edition number indicated by the replication data object sequence identifier is higher than the version/edition number indicated by the CDC data object sequence identifier, the processing circuitry may determine that the replication data object sequence identifier satisfies CDC data object sequence identifier. If the version/edition number indicated by the replication data object sequence identifier is not higher than the version/edition number indicated by the CDC data object sequence identifier, the processing circuitry may determine that the replication data object sequence identifier does not satisfy CDC data object sequence identifier.

As an example, the replication data object sequence identifier of the replication data object retrieved at step/operation 604 may indicate a version number of 1.4, and the CDC data object sequence identifier of the retrieved CDC data object may indicate a version number of 2.1. In this example, the processing circuitry determines that the replication data object sequence identifier does not satisfy the CDC data object sequence identifier, and the example method proceeds to step/operation 614.

As another example, the replication data object serial identifier of the replication data object retrieved at step/operation 604 may indicate a version number 1.4, and the CDC data object serial identifier of the retrieved CDC data object may indicate a version number 1.0. In this example, the processing circuitry determines that the replication data object subsequence identifier satisfies the CDC data object subsequence identifier, and the example method proceeds to step/operation 612.

Referring back to FIG. 6, if, at step/operation 610, the processing circuitry determines that the replication data object sequence identifier satisfies the CDC data object sequence identifier, the example method 600 proceeds to step/operation 612. At step/operation 612, a processing circuitry (such as the processor 305 of the network service server 107 described above in connection with FIG. 1A, FIG. 1B, and FIG. 3) may store the corresponding replication data object as one of the plurality of replica data objects.

In some embodiments, based on determining that the replication data object sequence identifier satisfies the CDC data object sequence identifier, the processing circuitry determines that the replication data object represents a more recent version of the source data object as compared to that of the CDC data object (as otherwise the version/edition number of replication data object sequence identifier would not be higher than that of the CDC data object sequence identifier).

As such, the processing circuitry may store the replication data object as one of the plurality of replica data objects (e.g. corresponding to a source data object associated with the same serial identifier) in an external-service-accessible replica data object repository (such as, but not limited to, the example external-service-accessible replica data object repository 105 illustrated and described above in connection with FIG. 1A and FIG. 1B) in response to determining that the corresponding replication data object sequence identifier satisfies the corresponding CDC data object sequence identifier.

Referring back to FIG. 6, subsequent to step/operation 612, the example method 600 proceeds to step/operation 616 and ends.

If, at step/operation 610, the processing circuitry determines that the replication data object sequence identifier does not satisfy the CDC data object sequence identifier, the example method 600 proceeds to step/operation 614. At step/operation 614, a processing circuitry (such as the processor 305 of the network service server 107 described above in connection with FIG. 1A, FIG. 1B, and FIG. 3) may store the corresponding CDC data object as one of the plurality of replica data objects.

In some embodiments, based on determining that the replication data object sequence identifier does not satisfy the CDC data object sequence identifier, the processing circuitry determines that the CDC data object presents a more recent version of the source data object as compared to that of the replication data object (as otherwise the version/edition number of replication data object sequence identifier would be higher than that of the CDC data object sequence identifier).

As such, the processing circuitry may store the CDC data object as one of the plurality of replica data objects (e.g. corresponding to a source data object associated with the same serial identifier) in an external-service-accessible replica data object repository (such as, but not limited to, the example external-service-accessible replica data object repository 105 illustrated and described above in connection with FIG. 1A and FIG. 1B) in response to determining that the corresponding replication data object sequence identifier does not satisfy the corresponding CDC data object sequence identifier.

Referring back to FIG. 6, subsequent to step/operation 614, the example method 600 proceeds to step/operation 616 and ends.

Referring now to FIG. 7, an example diagram 700 is illustrated. In particular, the example diagram 700 illustrates examples of dynamically replicating data objects and storing data objects in accordance with example embodiments of the present disclosure.

In the example shown in FIG. 7, the network service cloud 109 may receive a data object replication request 701, similar to those described above in connection with at least step/operation 404 of FIG. 4. For example, a client device or a network server that is external to the network service cloud 109 may transmit the data object replication request 701 to the network service cloud 109.

In some embodiments, the data object replication request 701 may comprise an electronic request to replicate one or more source data objects stored in the external-access-limited source data object repository 103A that is associated with a tenant identifier, and store the duplicated data objects to the external-service-accessible replica data object repository 105.

In some embodiments, in response to receiving the data object replication request, a processing circuitry (such as the processor 305 of the network service server 107 described above in connection with FIG. 1A, FIG. 1B, and FIG. 3) may generate a plurality of bootstrap task objects 703 and at least one CDC task object 705.

As described above, the plurality of bootstrap task objects 703 represents electronic tasks to replicate or duplicate source data objects stored in the external-access-limited source data object repository 103A that are associated with the tenant identifier. In some embodiments, the processing circuitry may execute the plurality of bootstrap task objects 703 to generate a plurality of replication data objects 707, which may comprise replicated copies of source data objects associated with the tenant identifier and may be stored in the processing queue data object 711.

In some embodiments, a processing circuitry (such as the processor 305 of the network service server 107 described above in connection with FIG. 1A, FIG. 1B, and FIG. 3) may execute the at least one CDC task object 705 in response to receiving at least one CDC event indication indicating one or more changes associated with at least one of the plurality of source data objects stored in the external-access-limited source data object repository 103A, similar to those described above. In some embodiments, when executing the at least one CDC task object 705, the processing circuitry may generate at least one CDC data object 709. As described above, the at least one CDC data object may comprise a replicated copy of the changed source data object (or a replicated copy of changes associated with the source data object, and may be stored in the processing queue data object 711.

In the example shown in FIG. 7, a processing circuitry (such as the processor 305 of the network service server 107 described above in connection with FIG. 1A, FIG. 1B, and FIG. 3) may store both the plurality of replication data objects 707 and the at least one CDC data object 709 to a processing queue data object 711. In some embodiments, the processing circuitry may generate a plurality of replica data objects based on processing the plurality of replication data objects 707 and the at least one CDC data object 709 in the processing queue data object 711, similar to those described above.

In some embodiments, subsequent to generating the plurality of replica data objects, the processing circuitry may store the plurality of replica data objects in the external-service-accessible replica data object repository 105. As described above, the external-service-accessible replica data object repository 105 may be accessible to client devices and network servers that are outside of or external to the network service cloud 109. As such, the client device or the network server where the data object replication request 701 originates from may access the replica data objects in the external-service-accessible replica data object repository 105.

Referring now to FIG. 8, an example diagram 800 is illustrated. In particular, the example diagram 800 illustrates examples of dynamically replicating data objects and storing data objects in accordance with example embodiments of the present disclosure.

In the example shown in FIG. 8, the network service cloud 109 may receive a data object replication request 802, similar to those described above in connection with at least step/operation 404 of FIG. 4. For example, a client device or a network server that is external to the network service cloud 109 may transmit the data object replication request 802 to the network service cloud 109.

In some embodiments, the data object replication request 802 may comprise an electronic request to replicate one or more source data objects stored in the external-access-limited source data object repository 103A that is associated with a tenant identifier, and store the replicated data objects to the external-service-accessible replica data object repository 105.

In some embodiments, in response to receiving the data object replication request, a processing circuitry (such as the processor 305 of the network service server 107 described above in connection with FIG. 1A, FIG. 1B, and FIG. 3) may generate a plurality of bootstrap task objects 804 and an update task object 806. In some embodiments, the update task object 806 represents an electronic task to update the source data objects stored in the external-access-limited source data object repository 103A. For example, the update task object 806 may be in the form of a network service that directly applies updates to source data objects stored in the external-access-limited source data object repository 103A.

In some embodiments, a processing circuitry (such as the processor 305 of the network service server 107 described above in connection with FIG. 1A, FIG. 1B, and FIG. 3) may execute the plurality of bootstrap task objects to generate a plurality of replication data objects 808 based on the source data objects stored in the external-access-limited source data object repository 103A. In this example, the plurality of replication data objects 808 captures the latest updates and changes to the source data objects thanks to the update task object 806. The processing circuitry may further store the plurality of replication data objects 808 in the processing queue data object 810, and may generate a plurality of replica data objects based on processing the plurality of replication data objects stored in the processing queue data object 810.

In some embodiments, subsequent to generating the plurality of replica data objects, the processing circuitry may store the plurality of replica data objects in the external-service-accessible replica data object repository 105. As described above, the external-service-accessible replica data object repository 105 may be accessible to client devices and network servers that are outside of or external to the network service cloud 109. As such, the client device or the network server where the data object replication request 802 originates from may access the replica data objects in the external-service-accessible replica data object repository 105.

Converting Data Object

Referring now to FIG. 9, an example method 900 is illustrated. In particular, the example method 900 illustrates examples of dynamically converting data objects in accordance with example embodiments of the present disclosure.

As shown in FIG. 9, the example method 900 starts at step/operation 901 and then proceeds to step/operation 903. At step/operation 903, a processing circuitry (such as the processor 305 of the network service server 107 described above in connection with FIG. 1A, FIG. 1B, and FIG. 3) may determine a corresponding replica data object type identifier for a corresponding replica data object.

For example, the corresponding replica data object may be generated in accordance with various examples described herein, and may be stored in an external-service-accessible replica data object repository (such as, but not limited to, the external-service-accessible replica data object repository 105 in the example shown in FIG. 1A and FIG. 1B). As described above, a replica data object may be associated with a replica data object type identifier that identifies a type associated with the replica data object. Examples of replica data object type identifiers comprise at least a project data object type identifier and an issue data object type identifier.

Referring back to FIG. 9, subsequent to step/operation 903, the method 900 proceeds to step/operation 905. At step/operation 905, a processing circuitry (such as the processor 305 of the network service server 107 described above in connection with FIG. 1A, FIG. 1B, and FIG. 3) may select, based at least in part on the corresponding replica data object type identifier, a corresponding data object conversion schema.

In some embodiments, one or more data object conversion schema may be generated and stored in a network service cloud. Each of the one or more data object conversion schema may be associated with one particular data object type. For example, a data object conversion schema may be associated with an issue data object type, and may define a protocol, a guideline, a blueprint, and/or a plan for converting the data object that is of issue data object type from one data object structure to another data object structure. Additionally, or alternatively, a data object conversion schema may be associated with a project data object type, and may define a protocol, a guideline, a blueprint, and/or a plan for converting the data object that is of project data object type from one data object structure to another data object structure.

As such, the processing circuitry may retrieve a plurality of data object conversion schemas from the network service cloud, and select a corresponding data object conversion schema from the plurality of data object conversion schemas based on the replica data object type identifier determined at step/operation 903.

Referring back to FIG. 9, subsequent to step/operation 905, the method 900 proceeds to step/operation 907. At step/operation 907, a processing circuitry (such as the processor 305 of the network service server 107 described above in connection with FIG. 1A, FIG. 1B, and FIG. 3) may convert the corresponding replica data object based at least in part on the corresponding data object conversion schema selected at step/operation 905.

As described above, an example data object conversion schema refers to a protocol, a guideline, a blueprint, and/or a plan for converting a data object from one data object structure to another data object structure. As illustrated in the FIG. 9, various embodiments of the present disclosure may select a data object conversion schema that is specific to the data object type of a data object, and thus various embodiments of the present disclosure may dynamically convert the data objects (such as, but not limited to, replica data objects) based on their corresponding data object type identifiers.

Additional details associated with converting the replica data objects are described herein, including but not limited to, those described in connection with at least FIG. 10 to FIG. 14.

Referring back to FIG. 9, subsequent to step/operation 907, the method 900 proceeds to step/operation 909 and ends.

Referring now to FIG. 10, an example method 1000 is illustrated. In particular, the example method 1000 illustrates examples of dynamically converting data objects based at least in part on the data object types associated with the data objects in accordance with example embodiments of the present disclosure.

As shown in FIG. 10, the example method 1000 starts at step/operation 1002 and then proceeds to step/operation 1004. At step/operation 1004, a processing circuitry (such as the processor 305 of the network service server 107 described above in connection with FIG. 1A, FIG. 1B, and FIG. 3) may determine whether a replica data object is associated with an issue data object type identifier or a project data object type identifier.

For example, the processing circuitry may determine whether the replica data object is associated with an issue data object type identifier or a project data object type identifier similar to those described above in connection with at least step/operation 903 of FIG. 9.

Referring back to FIG. 10, if, at step/operation 1004, the processing circuitry determines that the corresponding replica data object is associated with an issue data object type identifier, the example method 1000 proceeds to step/operation 1006. At step/operation 1006, a processing circuitry (such as the processor 305 of the network service server 107 described above in connection with FIG. 1A, FIG. 1B, and FIG. 3) may select a data object conversion schema corresponding to issue data object type identifier.

For example, the processing circuitry may select a data object conversion schema corresponding to an issue data object type identifier similar to those described above in connection with at least step/operation 905 of FIG. 9.

Referring back to FIG. 10, subsequent to step/operation 1006, the method 1000 proceeds to step/operation 1008. At step/operation 1008, a processing circuitry (such as the processor 305 of the network service server 107 described above in connection with FIG. 1A, FIG. 1B, and FIG. 3) may extract issue priority metadata, issue resolution metadata, issue status metadata, issue status category metadata, issue type metadata, and/or issue history metadata from the corresponding replica data object associated with step/operation 1004.

In some embodiments, extracting various metadata from the replica data object provides an initiating step in converting the corresponding replica data object associated with an issue data object type identifier. As described above, the issue priority metadata extracted from the replica data object may describe or comprise data and/or information associated with a priority of the issue that the replica data object represents. The issue resolution metadata extracted from the replica data object may describe or comprise data and/or information associated with a resolution of the issue that the replica data object represents. The issue status metadata extracted from the replica data object may describe or comprise data and/or information associated with a current status of the issue that the replica data object represents. The issue status category metadata extracted from the replica data object may describe or comprise data and/or information associated with a status category associated with the issue that the replica data object represents. The issue type metadata extracted from the replica data object may describe or comprise data and/or information associated with a type of the issue that the replica data object represents. The issue history metadata extracted from the replica data object may describe or comprise data and/or information associated with a history of the issue that the replica data object represents.

In some embodiments, the type(s) of metadata to be extracted from the replica data object may be defined by the data object conversion schema that corresponds to issue data object type identifier as selected as step/operation 1006. While FIG. 10 and the associated description provides examples of metadata to be extracted from the replica data object, it is noted that the scope of the present disclosure is not limited to the description above. In some examples, one or more additional or alternative metadata may be extracted from the replica data object that is associated with an issue data object type identifier in converting the replica data object.

Referring back to FIG. 10, subsequent to step/operation 1008, the method 1000 proceeds to step/operation 1010. At step/operation 1010, a processing circuitry (such as the processor 305 of the network service server 107 described above in connection with FIG. 1A, FIG. 1B, and FIG. 3) may generate a star-structured issue data object based on the corresponding replica data object and the corresponding data conversion schema.

In some embodiments, the star-structured issue data object comprises a plurality of nodes that are connected to one another via one or more edges. In some embodiments, the processing circuitry may generate each of the plurality of nodes based at least in part on one or more of the issue priority metadata, the issue resolution metadata, the issue status metadata, the issue status category metadata, the issue type metadata, and/or the issue history metadata extracted from the replica data object at step/operation 1008.

Referring now to FIG. 11, an example star-structured issue data object 1100 in accordance with example embodiments of the present disclosure is illustrated. In the example shown in the FIG. 11, the example star-structured issue data object 1100 comprises a plurality of nodes, including an issue priority metadata node 1101, an issue node 1103, an issue type metadata node 1105, an issue resolution metadata node 1107, an issue status metadata node 1109, an issue status category metadata node 1111, and an issue history metadata node 1113.

In some embodiments, each of the nodes of the example star-structured issue data object 1100 may comprise one or more data fields.

For example, the issue priority metadata node 1101 comprises a Tenant ID data field, an Activation ID data field, a Priority ID data field, a Name data field, a Description data field, a Status Color data field, a Sort Order data field, and/or a Is Deleted data field Additionally, or alternatively, the issue node 1103 comprises a Tenant ID data field, an Activation ID data field, an Issue ID data field, a URL data field, an Issue Key data field, an Issue Number data field, a Project ID data field, a Creator ID data field, an Issue Type ID data field, a Summary data field, an Assignee ID data field, a Reporter ID data field, a Description data field, a Status ID data field, a Priority ID data field, a Resolution ID data field, a Created Date data field, a Resolution date data field, an Updated date data field, a Due date data field, an Environment data field, a Component IDs data field, a Labels data field, a Fix version IDs data field, a Version IDs data field, a Time estimated secs data field, an Original time estimated secs data field, and/or a Is deleted data field.

Additionally, or alternatively, the issue type metadata node 1105 comprises a Tenant ID data field, an Activation ID data field, an Issue Type ID data field, a Name data field, a Is subtask data field, a Description data field, an Is deleted data field.

Additionally, or alternatively, the issue resolution metadata node 1107 comprises a Tenant ID data field, an Activation ID data field, a Resolution ID data field, a Name data field, a Description data field, and/or a Is Deleted data field.

Additionally, or alternatively, the issue status metadata node 1109 comprises a Tenant ID data field, an Activation ID data field, a Status ID data field, a Name data field, a Description data field, a Status Category ID data field, and/or a Is Deleted data field.

Additionally, or alternatively, the issue status category metadata node 1111 comprises a Tenant ID data field, an Activation ID data field, a Status Category ID data field, a Key data field, a Name data field, and/or a Color Name data field.

Additionally, or alternatively, the issue history metadata node 1113 comprises a Tenant ID data field, an Issue ID data field, a Changelog ID data field, an Author User ID data field, a Created Date data field, a Field data field, a Field ID data field, a From data field, a From String data field, a To data field, a To String data field, and/or an Update Time Stamp data field.

In some embodiments, each of the nodes of the example star-structured issue data object 1100 may be connected to one or more other nodes via one or more edges. For example, the issue priority metadata node 1101 is connected to the issue node 1103. Additionally, or alternatively, the issue type metadata node 1105 is connected to the issue node 1103. Additionally, or alternatively, the issue resolution metadata node 1107 is connected to the issue node 1103. Additionally, or alternatively, the issue history metadata node 1113 is connected to the issue node 1103. Additionally, or alternatively, the issue status category metadata node 1111 is connected to the issue status metadata node 1109, and the issue status metadata node 1109 is connected to the issue node 1103.

While FIG. 11 and the description above provides an example of a star-structured issue data object, it is noted that the scope of the present disclosure is not limited to the description above. In some examples, an example star-structured issue data object may comprise one or more additional and/or alternative elements, such as, but not limited to, one or more additional or alternative nodes, one or more additional or alternative edges, and/or the like.

Referring back to FIG. 10, subsequent to step/operation 1010, the method 1000 proceeds to step/operation 1018 and ends.

Referring back to step/operation 1004 of FIG. 10, if the processing circuitry determines that the corresponding replica data object is associated with a project data object type identifier, the example method 1000 proceeds to step/operation 1012. At step/operation 1012, a processing circuitry (such as the processor 305 of the network service server 107 described above in connection with FIG. 1A, FIG. 1B, and FIG. 3) may select a data object conversion schema corresponding to project data object type identifier.

For example, the processing circuitry may select a data object conversion schema corresponding to a project data object type identifier similar to those described above in connection with at least step/operation 905 of FIG. 9.

Referring back to FIG. 10, subsequent to step/operation 1012, the method 1000 proceeds to step/operation 1014. At step/operation 1014, a processing circuitry (such as the processor 305 of the network service server 107 described above in connection with FIG. 1A, FIG. 1B, and FIG. 3) may extract project type metadata, project changelog metadata, project version metadata, project category metadata, and/or project component metadata from the corresponding replica data object.

In some embodiments, extracting various metadata from the replica data object provides an initiating step in converting the corresponding replica data object that is associated with a project data object type identifier. In the example shown in FIG. 10, the project type metadata extracted from the replica data object may describe or comprise data and/or information associated with a type of project that the replica data object represents. The project changelog metadata extracted from the replica data object may describe or comprise data and/or information associated with changes of the project that the replica data object represents. The project version metadata extracted from the replica data object may describe or comprise data and/or information associated with a version of the project that the replica data object represents. The project category metadata extracted from the replica data object may describe or comprise data and/or information associated with a category of the project that the replica data object represents. The project component metadata extracted from the replica data object may describe or comprise data and/or information associated with one or more components of the project that the replica data object represents.

In some embodiments, the type(s) of metadata to be extracted from the replica data object may be defined by the data object conversion schema that corresponds to project data object type identifier as selected as step/operation 1012. While FIG. 10 and the associated description provides examples of metadata to be extracted from the replica data object, it is noted that the scope of the present disclosure is not limited to the description above. In some examples, one or more additional or alternative metadata may be extracted from the replica data object that is associated with a project data object type identifier in converting the replica data object.

Referring back to FIG. 10, subsequent to step/operation 1014, the method 1000 proceeds to step/operation 1016. At step/operation 1016, a processing circuitry (such as the processor 305 of the network service server 107 described above in connection with FIG. 1A, FIG. 1B, and FIG. 3) may generate a star-structured project data object based on the corresponding replica data object and the corresponding data conversion schema.

In some embodiments, the star-structured project data object comprises a plurality of nodes that are connected to one another via one or more edges. In some embodiments, the processing circuitry may generate each of the plurality of nodes based at least in part on one or more of the project type metadata, the project changelog metadata, the project version metadata, the project category metadata, and/or the project component metadata extracted from the replica data object at step/operation 1014.

Referring now to FIG. 12, an example star-structured project data object 1200 in accordance with example embodiments of the present disclosure is illustrated. In the example shown in the FIG. 12, the example star-structured project data object 1200 comprises a plurality of nodes, including a project type metadata node 1202, a project node 1204, a project category metadata node 1206, a project changelog metadata node 1208, a project version metadata node 1210, and a project component metadata node 1212.

In some embodiments, each of the nodes of the example star-structured project data object 1200 may comprise one or more data fields. For example, the project type metadata node 1202 comprises a Tenant ID data field, an Activation ID data field, a Project Type ID data field, a Formatted Key data field, and/or a Color data field.

Additionally, or alternatively, the project node 1204 comprises a Tenant ID data field, an Activation ID data field, a Project ID data field, a Project Key data field, a Project Name data field, a Description data field, a URL data field, a Project Category ID data field, a Project Type ID data field, a Simplified data field, a Style data field, a Project Lead ID data field, a Default Assignee ID data field, a Is Archived data field, and/or a Is Deleted data field.

Additionally, or alternatively, the project category metadata node 1206 comprises a Tenant ID data field, an Activation ID data field, a Project Category ID data field, a Name data field, and/or a Description data field.

Additionally, or alternatively, the project changelog metadata node 1208 comprises a Tenant ID data field, an Activation ID data field, a Change Log ID data field, an Author ID data field, a Created date data field, a Field data field, a From String data field, and/or a To String data field.

Additionally, or alternatively, the project version metadata node 1210 comprises a Tenant ID data field, an Activation ID data field, a Project ID data field, a Version ID data field, a Name data field, a Description data field, a Sequence data field, a Status data field, a Release Date data field, and/or a Start Date data field.

Additionally, or alternatively, the project component metadata node 1212 comprises a Tenant ID data field, an Activation ID data field, a Project ID data field, a Project Component ID data field, a Name data field, a Description data field, a Lead Account ID data field, a Default Assignee ID data field, and/or an Assignee Type data field.

In some embodiments, each of the nodes of the star-structured project data object 1200 may be connected to one or more other nodes via one or more edges. For example, the project type metadata node 1202 is connected to the project node 1204. Additionally, or alternatively, the project category metadata node 1206 is connected to the project node 1204. Additionally, or alternatively, the project changelog metadata node 1208 is connected to the project node 1204. Additionally, or alternatively, the project version metadata node 1210 is connected to the project node 1204. Additionally, or alternatively, the project component metadata node 1212 is connected to the project node 1204.

While FIG. 11 and the description above provides an example of a star-structured project data object, it is noted that the scope of the present disclosure is not limited to the description above. In some examples, an example star-structured project data object may comprise one or more additional and/or alternative elements, such as, but not limited to, one or more additional or alternative nodes, one or more additional or alternative edges, and/or the like.

Referring back to FIG. 10, subsequent to step/operation 1016, the method 1000 proceeds to step/operation 1018 and ends.

While the description above provides some examples of converting structures of data objects based on the corresponding data object type identifier and/or data object conversion schema, it is noted that the scope of the present disclosure is not limited to the description above. In some examples, example embodiments of the present disclosure may convert one or more data objects (such as, but not limited to, replica data objects that are generated in accordance with various embodiments of the present disclosure and stored in an external-service-accessible replica data object repository (such as the external-service-accessible replica data object repository 105 in the example shown in FIG. 1A and FIG. 1B)) that are associated with a tenant identifier to a tenant data object.

Referring now to FIG. 13, an example star-structured tenant data object 1300 in accordance with example embodiments of the present disclosure is illustrated.

In some embodiments, the star-structured tenant data object 1300 may be generated based at least in part on one or more data objects, such as, but not limited to, one or more replica data objects stored in an external-service-accessible replica data object repository (such as the external-service-accessible replica data object repository 105 in the example of FIG. 1A and FIG. 1B).

In some embodiments, the star-structured tenant data object 1300 may comprise one or more nodes and one or more edges connecting the one or more nodes. In some embodiments, each of the one or more nodes may correspond to one or more metadata associated with one or more replica data objects that are associated with the tenant identifier and of different data object types.

In the example shown FIG. 13, the star-structured tenant data object 1300 may comprise one or more nodes based on metadata extracted from replica data objects associated with the tenant identifier and of issue data object type. For example, the star-structured tenant data object 1300 may comprise an issue node 1309, an issue priority metadata node 1313, an issue resolution metadata node 1317, an issue status metadata node 1323, an issue status category metadata node 1319, and an issue type metadata node 1321, which are associated with one or more replica data objects that are of issue data object type, similar those described above. The star-structured tenant data object 1300 may also comprise a project node 1303, a project category metadata node 1305, a project component metadata node 1311, a project version metadata node 1307, which are associated with one or more replica data objects that are of project data object type, similar those described above. The star-structured tenant data object 1300 further comprises a user node 1304 based on the tenant identifier.

In some embodiments, the star-structured tenant data object 1300 may establish data connections between metadata of replica data objects that are of different data object types via one or more edges connecting the corresponding nodes. For example, the user node 1304 is connected to the issue node 1309, the project node 1303, the project component metadata node 1311, and the issue history metadata node 1315, respectively. Additionally, or alternatively, the project version metadata node 1307 is connected to the project node 1303 and the issue node 1309, respectively. Additionally, or alternatively, the project component metadata node 1311 is connected to the issue node 1309, the project node 1303, and the user node 1304, respectively.

Referring now to FIG. 14, an example table-structured issue data object 1400 in accordance with example embodiments of the present disclosure is illustrated. In some embodiments, the processing circuitry may convert one or more replica data objects that are of issue data object type to the example table-structured issue data object 1400 shown in FIG. 14.

For example, the table-structured issue data object 1400 may comprise an issue overview data table 1403, an issue assignee history data table 1404, and an issue status history data table 1406. In some embodiments, each of the issue overview data table 1403, the issue assignee history data table 1404, and the issue status history data table 1406 may comprise one or more data fields, as shown in the example of FIG. 14.

In various embodiments of the present disclosure, a data modeler may provide one or more data processing enhancements to facilitate the use of the data objects (for example, by generating a table-structured data object). For example, star-structured data objects may be designated as the "base schema," and the data and/or information for a table-structured data objects may be determined based on commonalities between star-structured data objects so as to join the star-structured data object to reduce efforts for constructing queries in the future. As such, example embodiments of the present disclosure may denormalize the data from multiple star-structured data objects into a single table-structured data object to eliminate the necessity of users having to join such data objects manually, which in turn reduces the latency in handling user queries (such as search queries), and thereby providing technical benefits and improvements.

Handling Data Object Access Request

Referring now to FIG. 15, an example method 1500 is illustrated. In particular, the example method 1500 illustrates examples of handling data object access requests in accordance with example embodiments of the present disclosure.

As shown in FIG. 15, the example method 1500 starts at step/operation 1501 and then proceeds to step/operation 1503. At step/operation 1503, a processing circuitry (such as the processor 305 of the network service server 107 described above in connection with FIG. 1A, FIG. 1B, and FIG. 3) may generate a tenant data object associated with a tenant identifier.

In some embodiments, the processing circuitry may generate a tenant data object associated with the tenant identifier based at least in part on the plurality of replica data objects.

For example, the processing circuitry may retrieve one or more replica data objects from an external-service-accessible replica data object repository (such as, but not limited to, the external-service-accessible replica data object repository 105 in the example shown in FIG. 1A and FIG. 1B), and generate the tenant data object based on one or more replica data objects associated with the tenant identifier. In some embodiments, the tenant data object is stored in an external-service-accessible replica data object repository (such as, but not limited to, the external-service-accessible replica data object repository 105 in the example shown in FIG. 1A and FIG. 1B).

In some embodiments, the tenant data object may be generated based at least in part on one or more replica data objects associated with issue data object type identifiers and/or project data object type identifiers. As described above, an example star-structured tenant data object is illustrated above in connection with FIG. 13. It is noted that the scope of the present disclosure is not limited to the example shown in FIG. 13. In some embodiments, an example tenant data object may be in other structures and/or forms.

Referring back to FIG. 15, subsequent to step/operation 1503, the method 1500 proceeds to step/operation 1505. At step/operation 1505, a processing circuitry (such as the processor 305 of the network service server 107 described above in connection with FIG. 1A, FIG. 1B, and FIG. 3) may receive a data object access request associated with the tenant data object and a requestor identifier.

As described above, a data object access request refers to an electronic request to access one or more replica data objects. In some embodiments, the processing circuitry may receive the data object access request from a client device or a network server that is external to or outside of a network service cloud. For example, the client device or the network server may transmit the data object access request to the network service cloud, indicating an electronic request to access a tenant data object that is stored in an external-service-accessible replica data object repository (such as, but not limited to, the external-service-accessible replica data object repository 105 in the example shown in FIG. 1A and FIG. 1B).

In some embodiments, the data object access request is associated with a requestor identifier that uniquely identifies the sender of an electronic request. For example, if the data object access request is transmitted from a client device associated with a user John, the data object access request is associated with a requestor identifier corresponding to John's. Additionally, or alternatively, if the data object access request is transmitted from a network server that relays an electronic request from a client device associated with the user John, the data object access request is associated with a requestor identifier corresponding to John's.

Referring back to FIG. 15, subsequent to step/operation 1505, the method 1500 proceeds to step/operation 1507. At step/operation 1507, a processing circuitry (such as the processor 305 of the network service server 107 described above in connection with FIG. 1A, FIG. 1B, and FIG. 3) may determine whether the requestor identifier is associated with the tenant identifier.

As described above, the tenant identifier of a tenant data object may identify the owner of the tenant data object, and may therefore provide access control of the tenant data object. For example, the network service cloud may only grant access to the tenant data object to computing devices that are associated with the tenant identifier, and/or computing devices that have been granted accesses to the tenant data object by the owner of the tenant data object.

If, at step/operation 1507, the processing circuitry determines that the requestor identifier is associated with the tenant identifier, the example method proceeds to step/operation 1509. At step/operation 1509, a processing circuitry (such as the processor 305 of the network service server 107 described above in connection with FIG. 1A, FIG. 1B, and FIG. 3) may retrieve the tenant data object from the external-service-accessible replica data object repository.

For example, the processing circuitry may determine that the requestor identifier associated with the data object access request at step/operation 1505 is the same as the tenant identifier associated with the tenant data object. Additionally, or alternatively, the processing circuitry may determine that the requestor identifier associated with the data object access request has been granted access to the tenant data object by the owner of the tenant data object. In response to determining that the requestor identifier is associated with the tenant identifier, the processing circuitry may retrieve the tenant data object from the external-service-accessible replica data object repository (for example, the external-service-accessible replica data object repository 105 in the example shown in FIG. 1A and FIG. 1B), and may transmit the tenant data object to a client device or a network server where the data object access request originates from.

Referring back to FIG. 15, if, at step/operation 1507, the processing circuitry determines that the requestor identifier is not associated with the tenant identifier, the example method proceeds to step/operation 1511. At step/operation 1511, a processing circuitry (such as the processor 305 of the network service server 107 described above in connection with FIG. 1A, FIG. 1B, and FIG. 3) may generate a data object access denial message.

For example, the processing circuitry may determine that the requestor identifier associated with the data object access request at step/operation 1505 is not the same as the tenant identifier associated with the tenant data object, and that the requestor identifier associated with the data object access request has not been granted access to the tenant data object by the owner of the tenant data object. As such, in some embodiments, in response to determining that the requestor identifier is not associated with the tenant identifier, the processing circuitry generates a data object access denial message. For example, the data object access denial message may comprise an electronic indication that the data object access request cannot be handled due to lack of access privilege. In some embodiments, the processing circuitry may transmit the data object access denial message to a client device or a network server where the data object access request originates from.

Referring back to FIG. 15, subsequent to step/operation 1509 and/or step/operation 1511, the example method 1500 proceeds to step/operation 1513 and ends.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein may come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, with the at least one processor, cause the apparatus to at least:

receive a data object replication request associated with a tenant identifier, wherein the tenant identifier is associated with an external-access-limited source data object repository comprising a plurality of source data objects associated with a plurality of source data object type identifiers;

in response to the data object replication request, generate a plurality of bootstrap task objects and at least one change data capture (CDC) task object, wherein each of the plurality of source data object type identifiers is associated with one of the plurality of bootstrap task objects;

execute the plurality of bootstrap task objects to generate a plurality of replication data objects corresponding to the plurality of source data objects and store the plurality of replication data objects to a processing queue data object;

in response to receiving at least one CDC event indication associated with at least one of the plurality of source data objects, execute the at least one CDC task object to generate at least one CDC data object based on the at least one CDC event indication and store the at least one CDC data object to the processing queue data object;

generate a plurality of replica data objects corresponding to the plurality of source data objects based at least in part on processing the plurality of replication data objects and the at least one CDC data object stored to the processing queue data object; and store the plurality of replica data objects in an external-service-accessible replica data object repository.

2. The apparatus of claim 1, wherein the plurality of bootstrap task objects represent a plurality of electronic tasks for replicating the plurality of source data objects.

3. The apparatus of claim 2, wherein, when executing the plurality of bootstrap task objects, the at least one non-transitory memory and the program code are configured to, with the at least one processor, cause the apparatus to at least:

replicate the plurality of source data objects.

4. The apparatus of claim 1, wherein the at least one CDC task object represents an electronic task for monitoring the at least one CDC event indication associated with the at least one of the plurality of source data objects.

5. The apparatus of claim 1, wherein the plurality of source data object type identifiers comprises at least a project data object type identifier and an issue data object type identifier.

6. The apparatus of claim 1, wherein each source data object of the plurality of source data objects is associated with a source data object sequence identifier.

7. The apparatus of claim 1, wherein each of the plurality of replication data objects is associated with a replication data object serial identifier and a replication data object sequence identifier, wherein the replication data object serial identifier corresponds to a source data object serial identifier of one of the plurality of source data objects, wherein the replication data object sequence identifier corresponds to a source data object sequence identifier of one of the plurality of source data objects.

8. The apparatus of claim 7, wherein the at least one CDC data object is associated with at least one CDC data object serial identifier and at least one CDC data object sequence identifier based at least in part on the at least one CDC event indication.

9. The apparatus of claim 8, wherein, when generating the plurality of replica data objects, the at least one non-transitory memory and the program code are configured to, with the at least one processor, cause the apparatus to:

retrieve a corresponding replication data object from the processing queue data object; and determine whether a corresponding replication data object serial identifier of the corresponding replication data object matches a corresponding CDC data object serial identifier of a corresponding CDC data object.

10. The apparatus of claim 9, wherein the at least one non-transitory memory and the program code are configured to, with the at least one processor, cause the apparatus to:

in response to determining that the corresponding replication data object serial identifier does not match the corresponding CDC data object serial identifier, store the corresponding replication data object as one of the plurality of replica data objects in the external-service-accessible replica data object repository.

11. The apparatus of claim 9, wherein the at least one non-transitory memory and the program code are configured to, with the at least one processor, cause the apparatus to:

in response to determining that the corresponding replication data object serial identifier matches the corresponding CDC data object serial identifier, determine whether a corresponding replication data object sequence identifier of the corresponding replication data object satisfies a corresponding CDC data object sequence identifier of the corresponding CDC data object.

12. The apparatus of claim 11, wherein the at least one non-transitory memory and the program code are configured to, with the at least one processor, cause the apparatus to:

in response to determining that the corresponding replication data object sequence identifier satisfies the corresponding CDC data object sequence identifier, store the corresponding replication data object as a replica data object of the plurality of replica data objects in the external-service-accessible replica data object repository; and in response to determining that the corresponding replication data object sequence identifier does not satisfy the corresponding CDC data object sequence identifier, store the corresponding CDC data object as the replica data object of the plurality of replica data objects in the external-service-accessible replica data object repository.

13. The apparatus of claim 1, wherein the at least one non-transitory memory and the program code are configured to, with the at least one processor, cause the apparatus to:

determine a corresponding replica data object type identifier of a corresponding replica data object stored in the external-service-accessible replica data object repository;

select, based at least in part on the corresponding replica data object type identifier, a corresponding data object conversion schema; and convert the corresponding replica data object based at least in part on the corresponding data object conversion schema.

14. The apparatus of claim 13, wherein the corresponding replica data object is associated with an issue data object type identifier, wherein, when converting the corresponding replica data object, the at least one non-transitory memory and the program code are configured to, with the at least one processor, cause the apparatus to:

extract issue priority metadata, issue resolution metadata, issue status metadata, issue status category metadata, issue type metadata, and issue history metadata from the corresponding replica data object; and generate a star-structured issue data object based on the corresponding replica data object, wherein the star-structured issue data object comprises a plurality of nodes, wherein each of the plurality of nodes is based at least in part on one or more of the issue priority metadata, the issue resolution metadata, the issue status metadata, the issue status category metadata, the issue type metadata, and the issue history metadata.

15. The apparatus of claim 13, wherein the corresponding replica data object is associated with a project data object type identifier, wherein, when converting the corresponding replica data object, the at least one non-transitory memory and the program code are configured to, with the at least one processor, cause the apparatus to:

extract project type metadata, project changelog metadata, project version metadata, project category metadata, and project component metadata from the corresponding replica data object; and generate a star-structured project data object based on the corresponding replica data object, wherein the star-structured project data object comprises a plurality of nodes, wherein each of the plurality of nodes is based at least in part on the project type metadata, the project changelog metadata, the project version metadata, the project category metadata, and the project component metadata.

16. The apparatus of claim 1, wherein the at least one non-transitory memory and the program code are configured to, with the at least one processor, cause the apparatus to:

generate a tenant data object associated with the tenant identifier based at least in part on the plurality of replica data objects.

17. The apparatus of claim 16, wherein the at least one non-transitory memory and the program code are configured to, with the at least one processor, cause the apparatus to:

receive a data object access request associated with the tenant data object and a requestor identifier;

determine whether the requestor identifier is associated with the tenant identifier;

in response to determining that the requestor identifier is associated with the tenant identifier, retrieve the tenant data object from the external-service-accessible replica data object repository; and in response to determining that the requestor identifier is not associated with the tenant identifier, generate a data object access denial message.

18. A computer-implemented method comprising:

receiving a data object replication request associated with a tenant identifier, wherein the tenant identifier is associated with an external-access-limited source data object repository comprising a plurality of source data objects associated with a plurality of source data object type identifiers;

in response to the data object replication request, generating a plurality of bootstrap task objects and at least one change data capture (CDC) task object, wherein each of the plurality of source data object type identifiers is associated with one of the plurality of bootstrap task objects;

executing the plurality of bootstrap task objects to generate a plurality of replication data objects corresponding to the plurality of source data objects and store the plurality of replication data objects to a processing queue data object;

in response to receiving at least one CDC event indication associated with at least one of the plurality of source data objects, executing the at least one CDC task object to generate at least one CDC data object based on the at least one CDC event indication and store the at least one CDC data object to the processing queue data object;

generating a plurality of replica data objects corresponding to the plurality of source data objects based at least in part on processing the plurality of replication data objects and the at least one CDC data object stored to the processing queue data object; and storing the plurality of replica data objects in an external-service-accessible replica data object repository.

19. The computer-implemented method of claim 18, wherein the plurality of bootstrap task objects represent a plurality of electronic tasks for replicating the plurality of source data objects.

20. A computer program product comprising at least one non-transitory computer-readable storage medium having computer-readable program code portions stored therein, the computer-readable program code portions comprising an executable portion configured to:

receive a data object replication request associated with a tenant identifier, wherein the tenant identifier is associated with an external-access-limited source data object repository comprising a plurality of source data objects associated with a plurality of source data object type identifiers;

in response to the data object replication request, generate a plurality of bootstrap task objects and at least one change data capture (CDC) task object, wherein each of the plurality of source data object type identifiers is associated with one of the plurality of bootstrap task objects;

execute the plurality of bootstrap task objects to generate a plurality of replication data objects corresponding to the plurality of source data objects and store the plurality of replication data objects to a processing queue data object;

in response to receiving at least one CDC event indication associated with at least one of the plurality of source data objects, execute the at least one CDC task object to generate at least one CDC data object based on the at least one CDC event indication and store the at least one CDC data object to the processing queue data object;

generate a plurality of replica data objects corresponding to the plurality of source data objects based at least in part on processing the plurality of replication data objects and the at least one CDC data object stored to the processing queue data object; and store the plurality of replica data objects in an external-service-accessible replica data object repository.

* * * * *